(12) United States Patent
Gupta et al.

(10) Patent No.: US 12,174,396 B2
(45) Date of Patent: Dec. 24, 2024

(54) OBJECT LOCALIZATION SYSTEM

(71) Applicant: Apple Inc., Cupertino, CA (US)

(72) Inventors: Tushar Gupta, Stanford, CA (US);
Aleksandr M. Movshovich, Santa Clara, CA (US); Arthur Y. Zhang, San Jose, CA (US); Ray L. Chang, Saratoga, CA (US); Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/331,045

(22) Filed: Jun. 7, 2023

(65) Prior Publication Data

US 2023/0314828 A1 Oct. 5, 2023

Related U.S. Application Data

(63) Continuation of application No. 17/021,943, filed on Sep. 15, 2020, now Pat. No. 11,709,372.
(Continued)

(51) Int. Cl.
*G02B 27/36* (2006.01)
*G02B 7/14* (2021.01)
(Continued)

(52) U.S. Cl.
CPC ............ *G02B 27/36* (2013.01); *G02B 7/14* (2013.01); *G02B 27/0172* (2013.01);
(Continued)

(58) Field of Classification Search
None
See application file for complete search history.

(56) References Cited

U.S. PATENT DOCUMENTS

| 5,341,213 A | 8/1994 | Giroux |
| 2004/0028258 A1 | 2/2004 | Naimark et al. |

(Continued)

FOREIGN PATENT DOCUMENTS

| CN | 101452116 | 6/2009 |
| JP | 2013257187 | 12/2013 |
| WO | 2006078537 | 7/2006 |

OTHER PUBLICATIONS

Office Action and Search Report (included English translation) from Chines Application No. 202010986202.3, mailed Jan. 15, 2024, pp. 1-12.

*Primary Examiner* — Robert E. Tallman
(74) *Attorney, Agent, or Firm* — Alexander A. Knapp; Kowert, Hood, Munyon, Rankin & Goetzel, P.C.

(57) ABSTRACT

Fiducial patterns that produce 2D Barker code-like diffraction patterns at a camera sensor are etched or otherwise provided on a cover glass in front of a camera. 2D Barker code kernels, when cross-correlated with the diffraction patterns captured in images by the camera, provide sharp cross-correlation peaks. Misalignment of the cover glass with respect to the camera can be derived by detecting shifts in the location of the detected peaks with respect to calibrated locations. Devices that include multiple cameras behind a cover glass with one or more fiducials on the cover glass in front of each camera are also described. The diffraction patterns caused by the fiducials at the various cameras may be analyzed to detect movement or distortion of the cover glass in multiple degrees of freedom.

20 Claims, 36 Drawing Sheets

Related U.S. Application Data

(60) Provisional application No. 62/907,414, filed on Sep. 27, 2019.

(51) Int. Cl.
| | | |
|---|---|---|
| *G02B 27/01* | (2006.01) | |
| *G02B 27/42* | (2006.01) | |
| *H04N 23/55* | (2023.01) | |
| *H04N 23/663* | (2023.01) | |

(52) U.S. Cl.
CPC ......... *G02B 27/4227* (2013.01); *H04N 23/55* (2023.01); *H04N 23/663* (2023.01); *G02B 2027/0138* (2013.01)

(56) References Cited

U.S. PATENT DOCUMENTS

| | | |
|---|---|---|
| 2009/0033920 A1 | 2/2009 | Simpson |
| 2014/0022373 A1 | 1/2014 | Kanarowski et al. |
| 2014/0169136 A1 | 6/2014 | Booij et al. |
| 2017/0337706 A1* | 11/2017 | Marsh .................... H04N 23/54 |
| 2017/0341371 A1 | 11/2017 | Muth et al. |
| 2018/0329061 A1 | 11/2018 | Pacala et al. |

* cited by examiner

*Desired diffraction pattern (5-bit Barker code)*

*Fiducial pattern on cover glass*

*Obtained diffraction pattern*

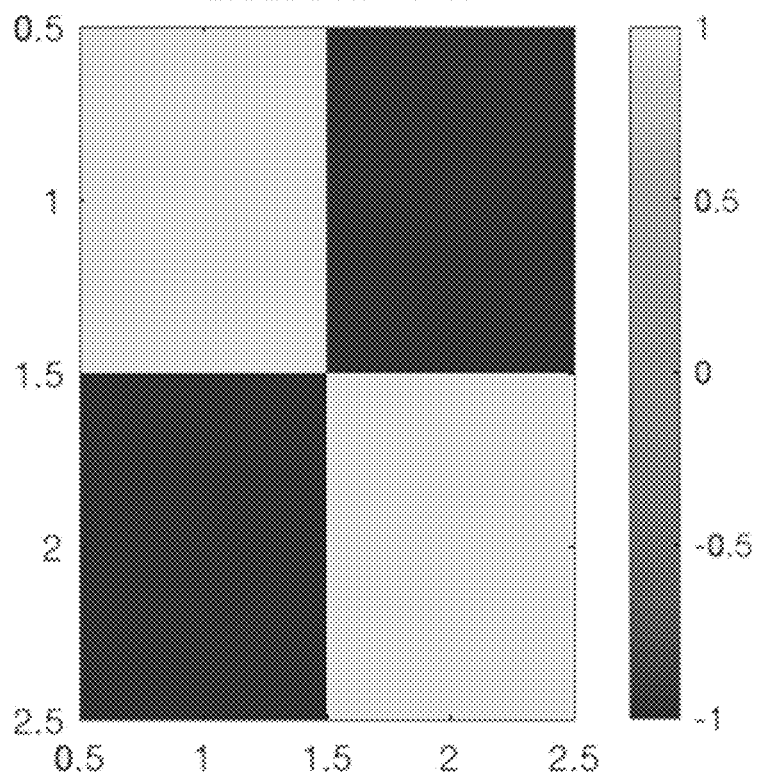
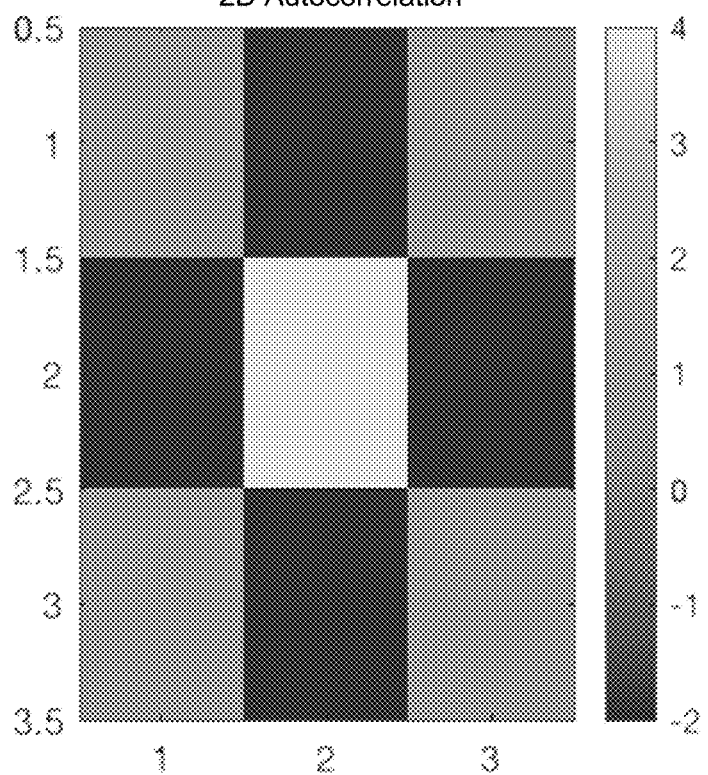
FIG. 5

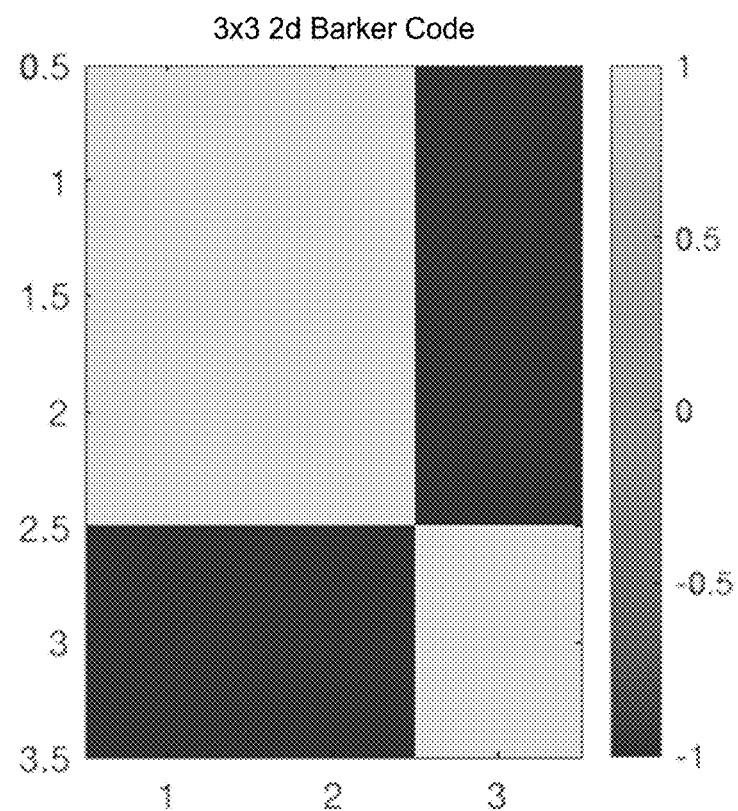
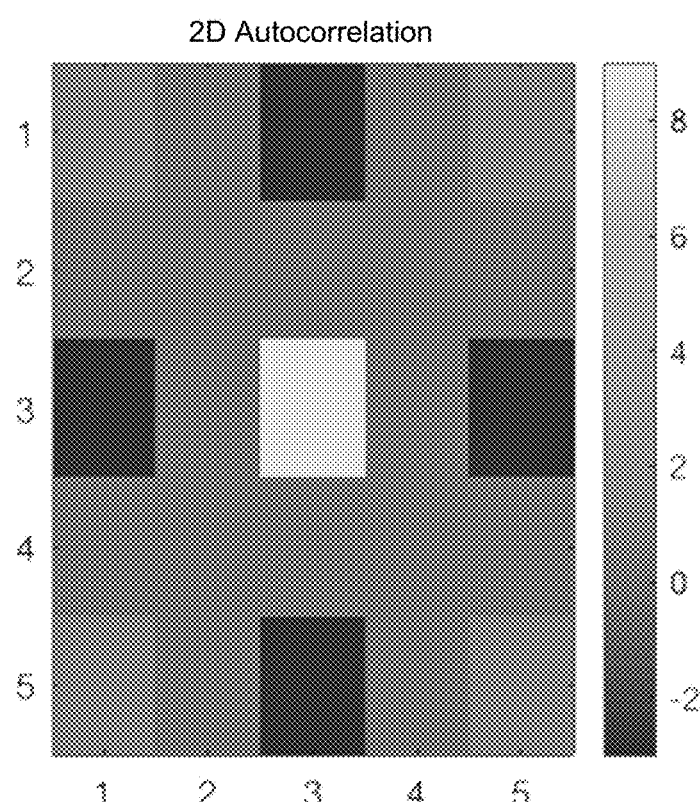
FIG. 6

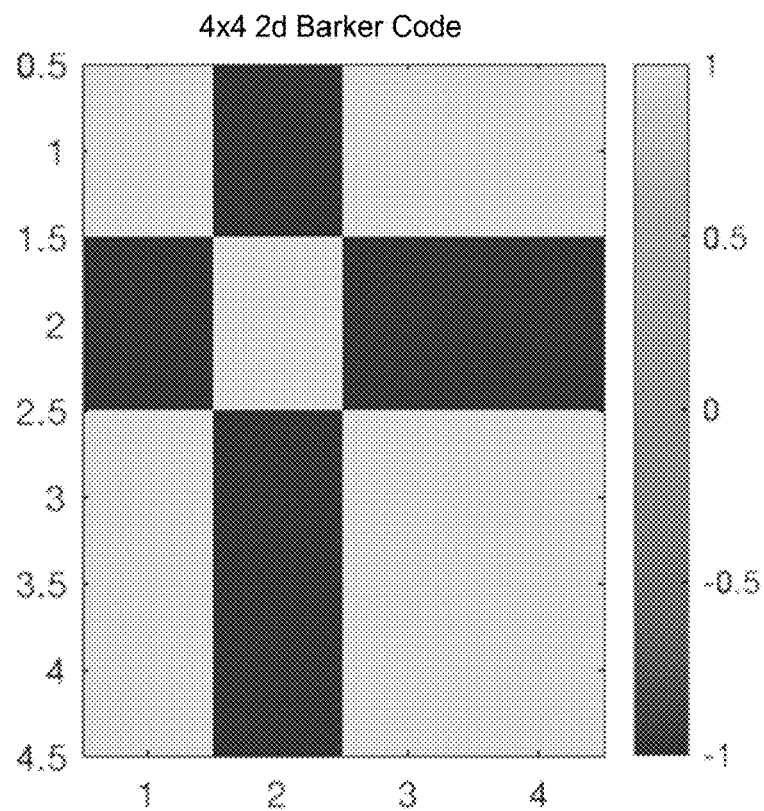
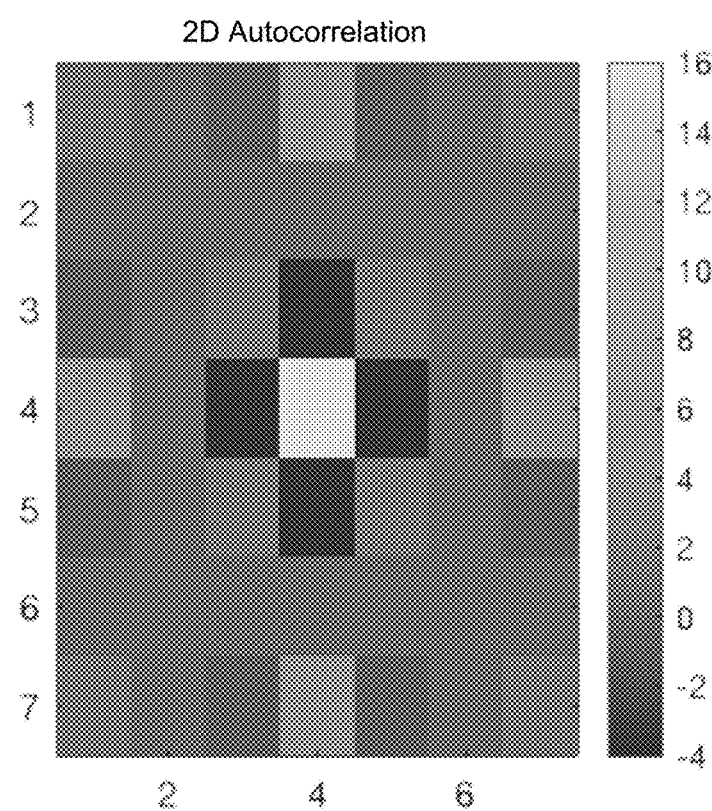
FIG. 7

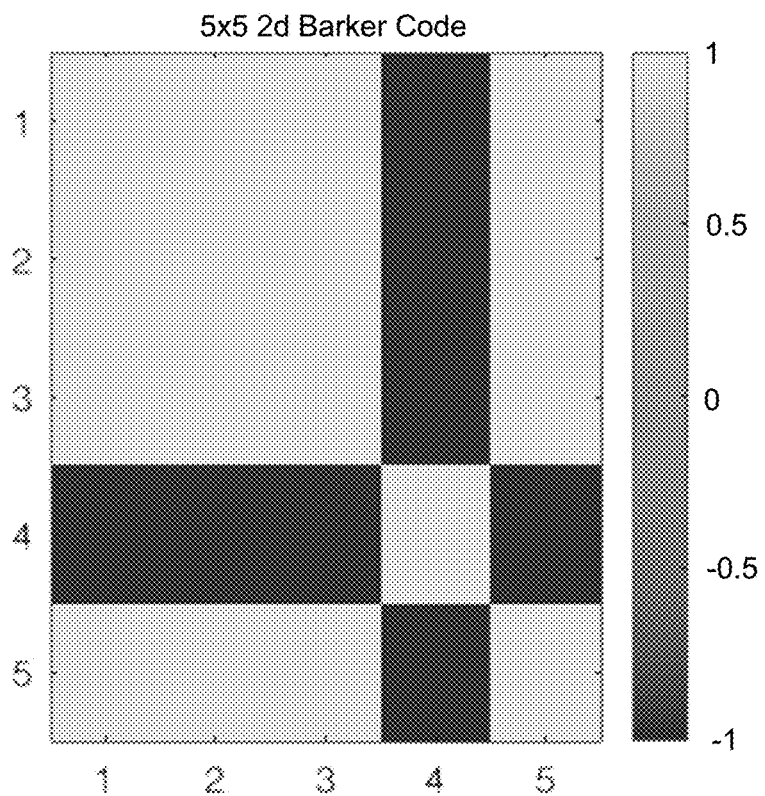
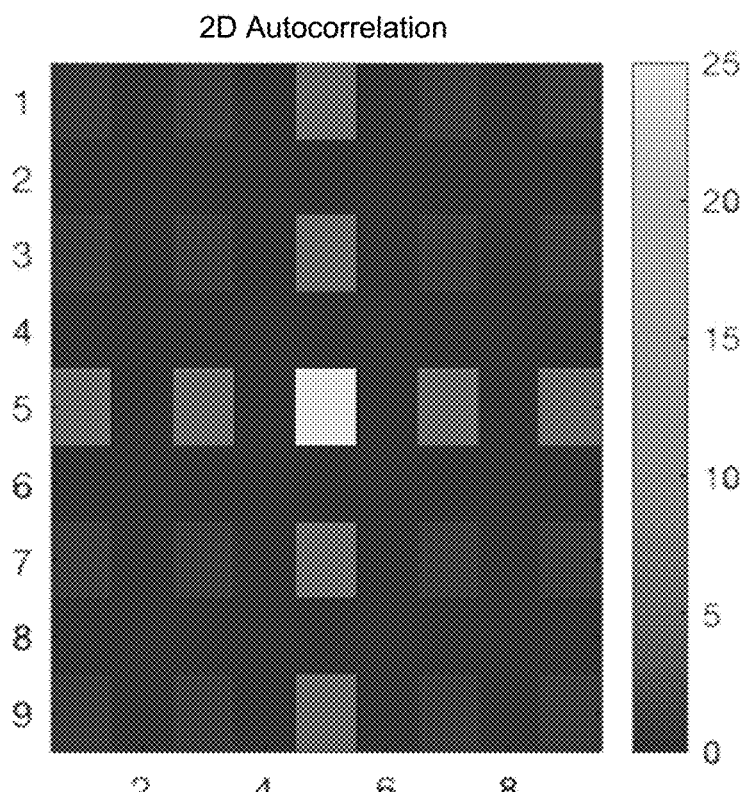
FIG. 8

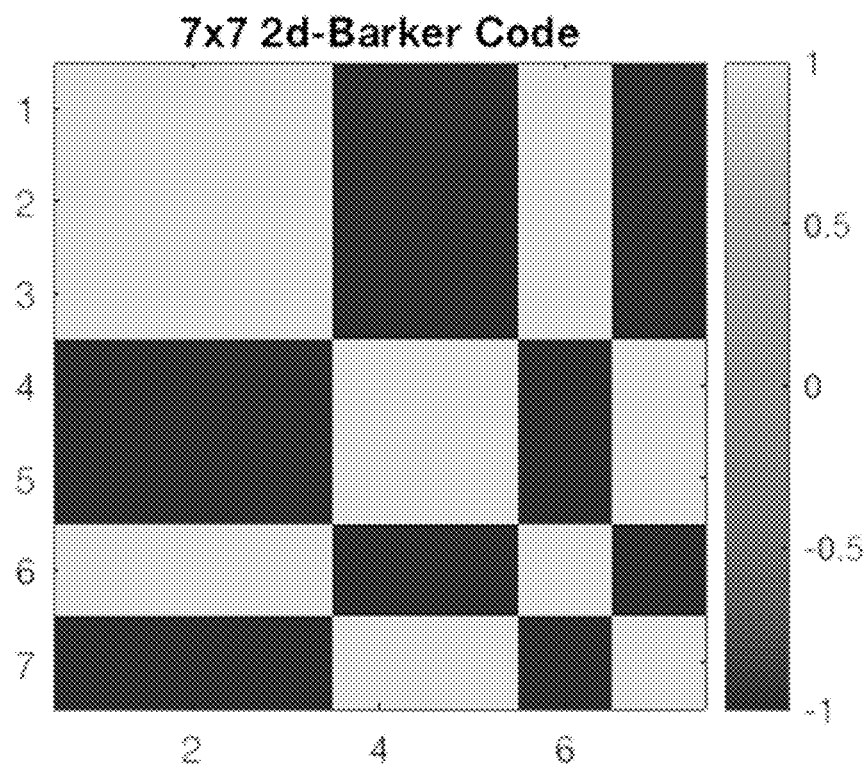
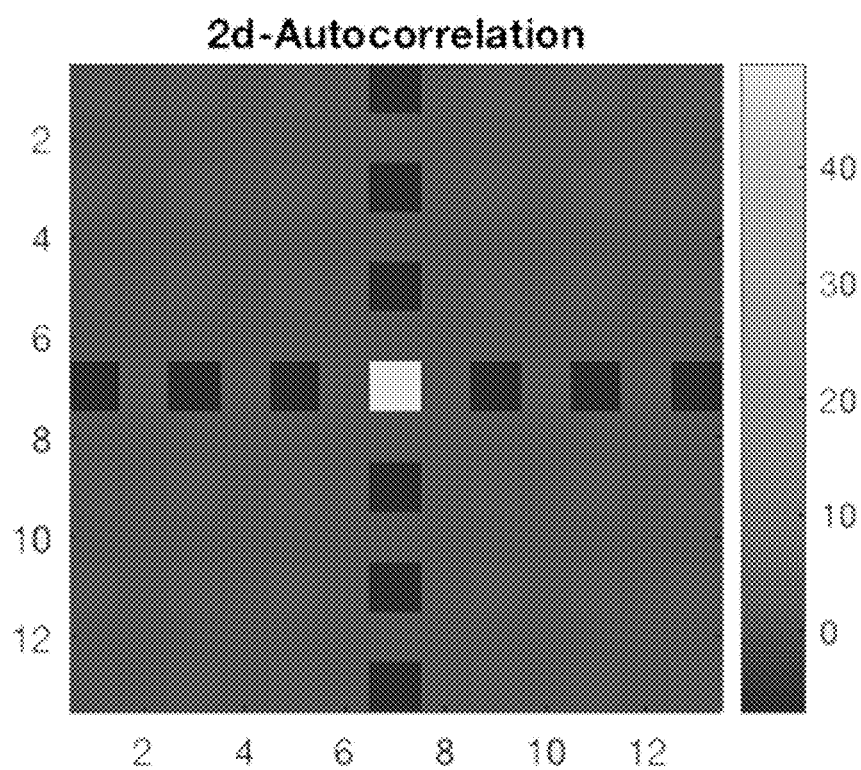
FIG. 9

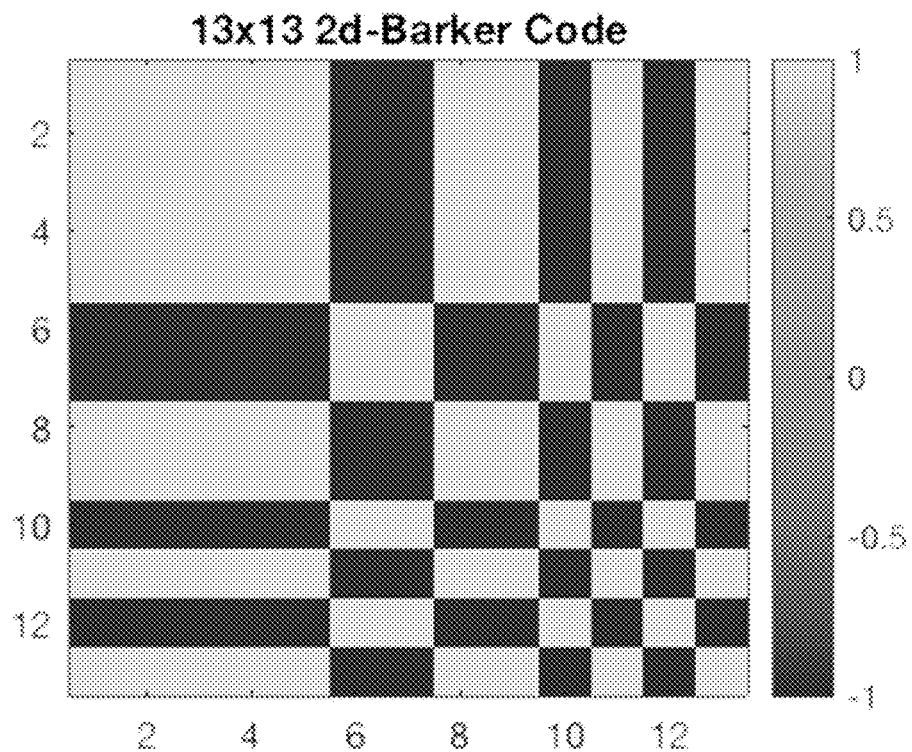
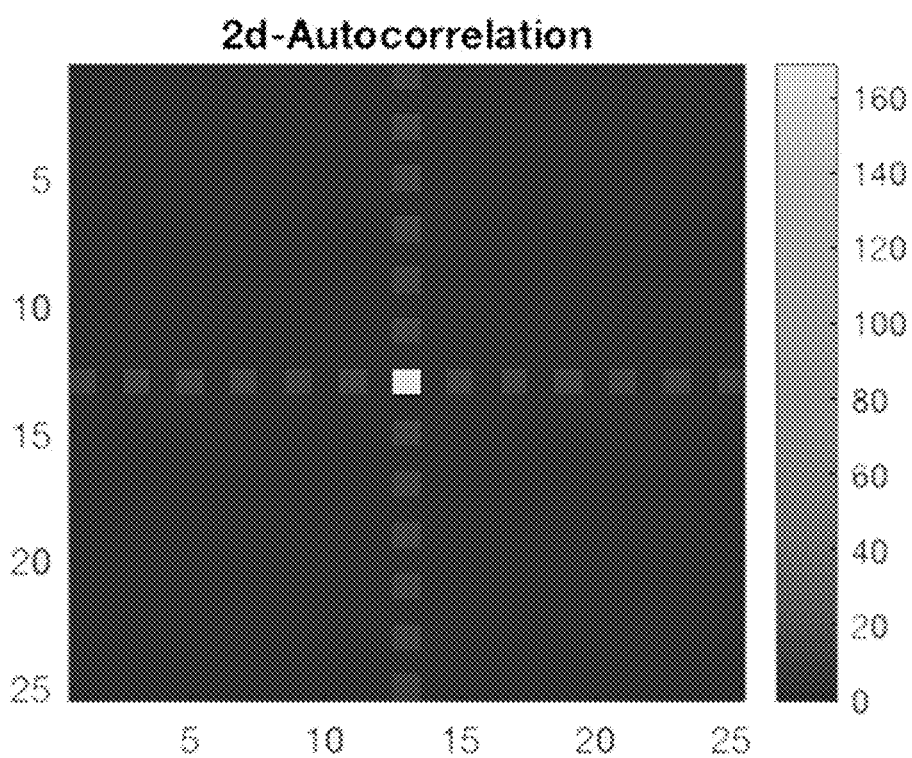
FIG. 10

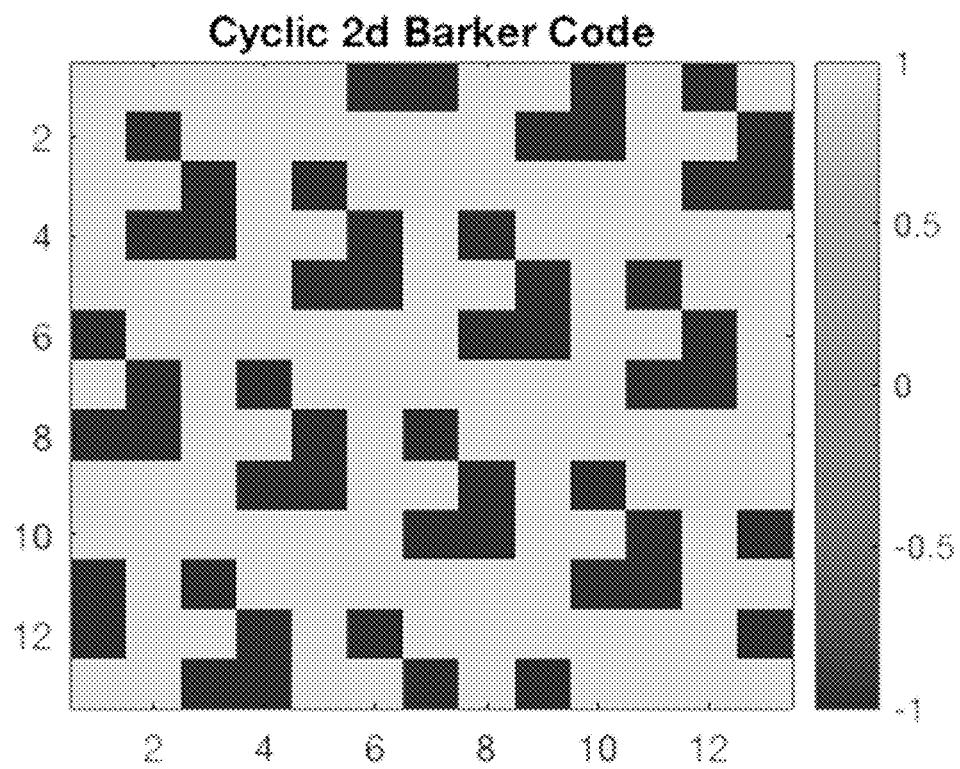
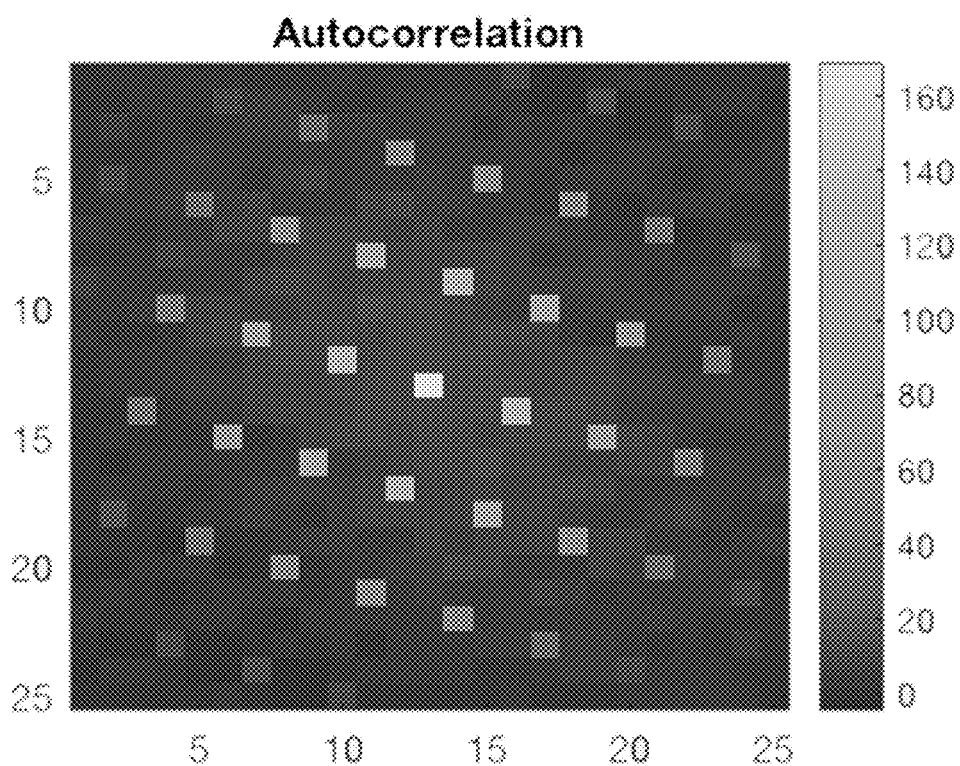
FIG. 11

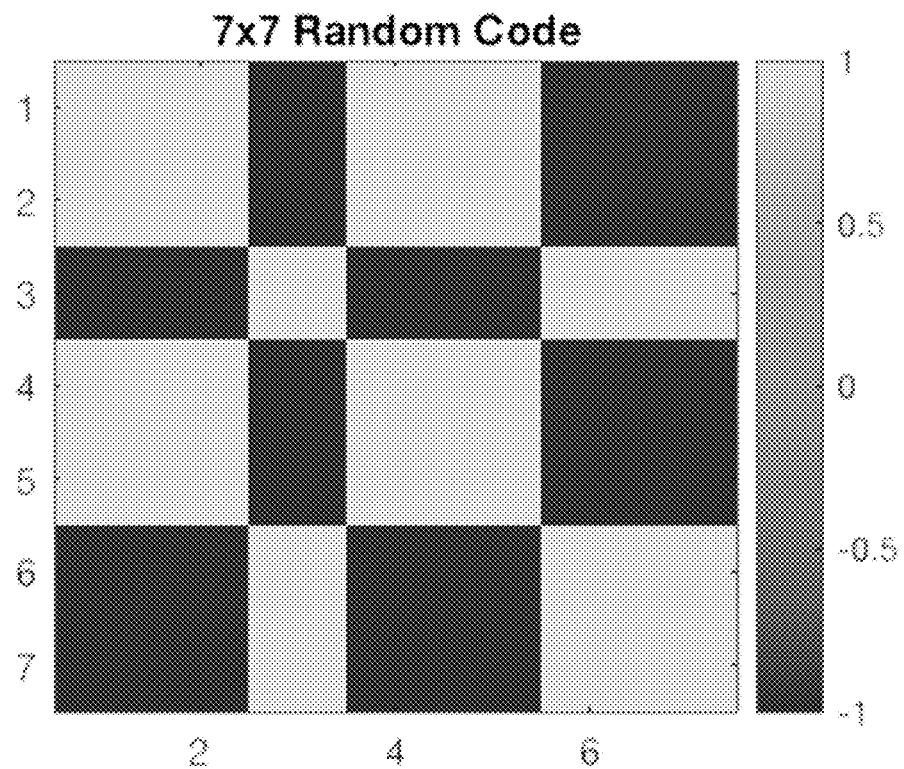
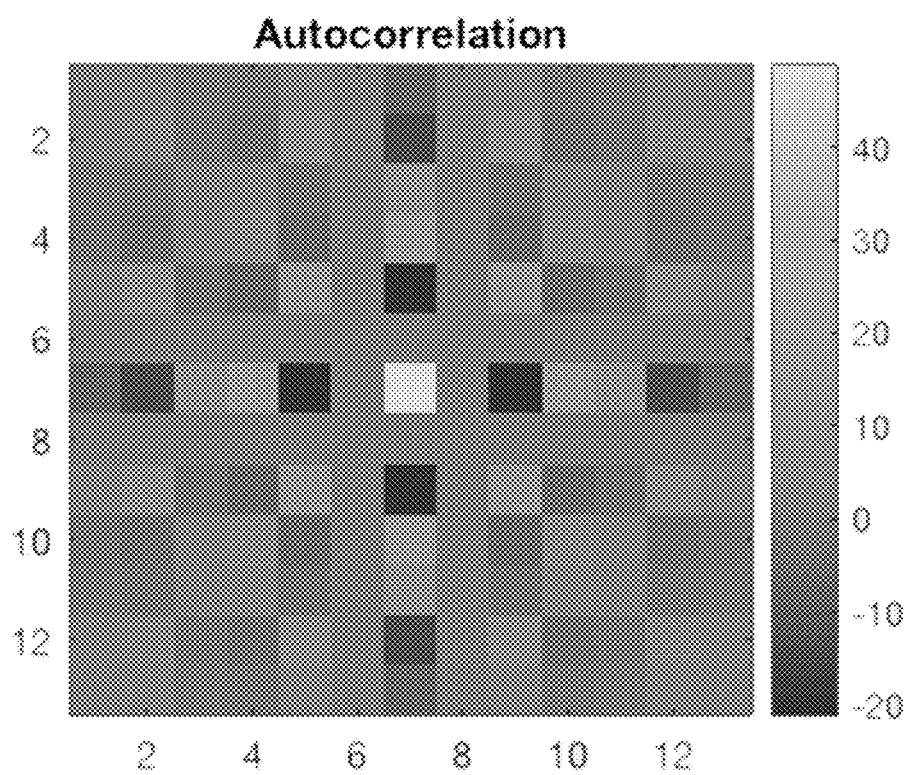
FIG. 12

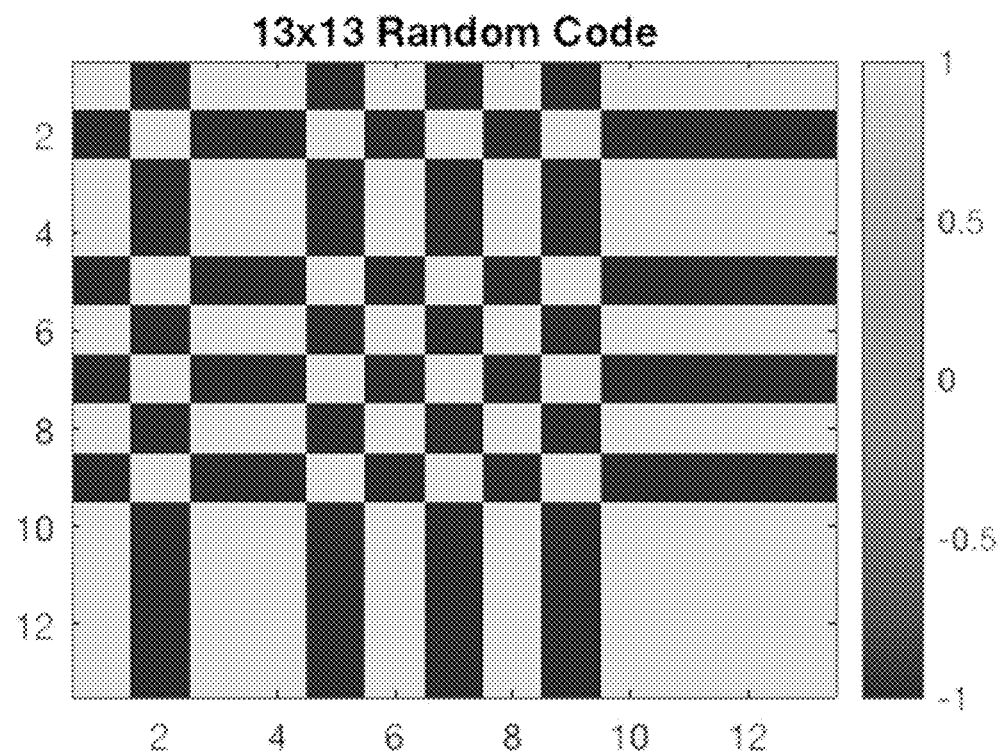
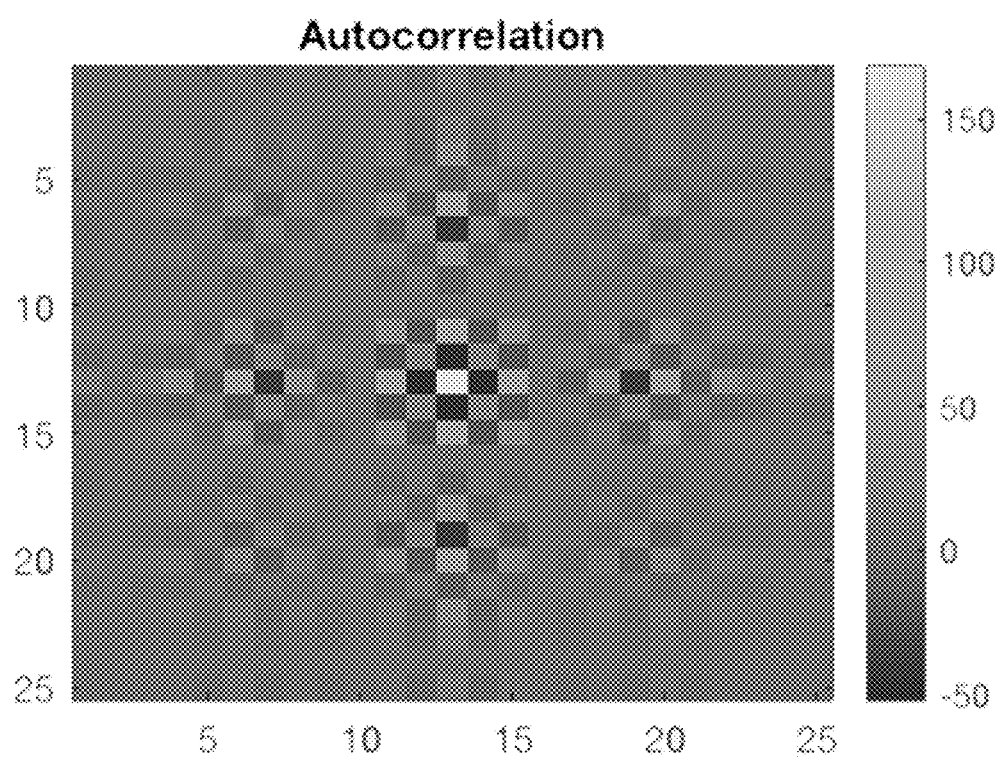
FIG. 13

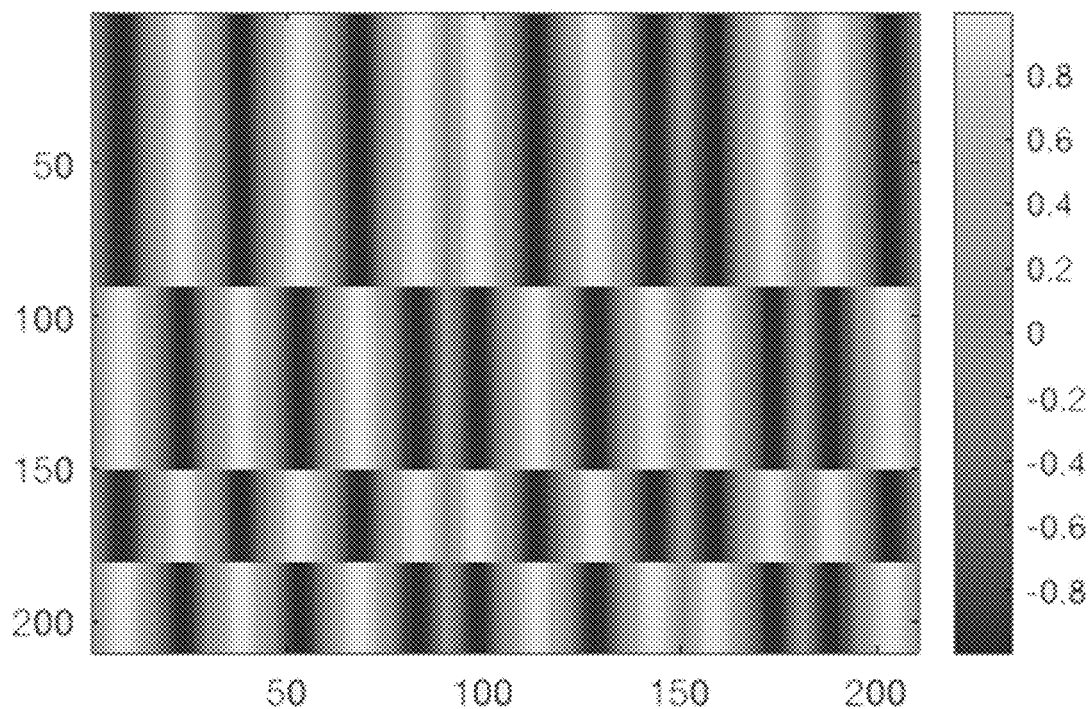
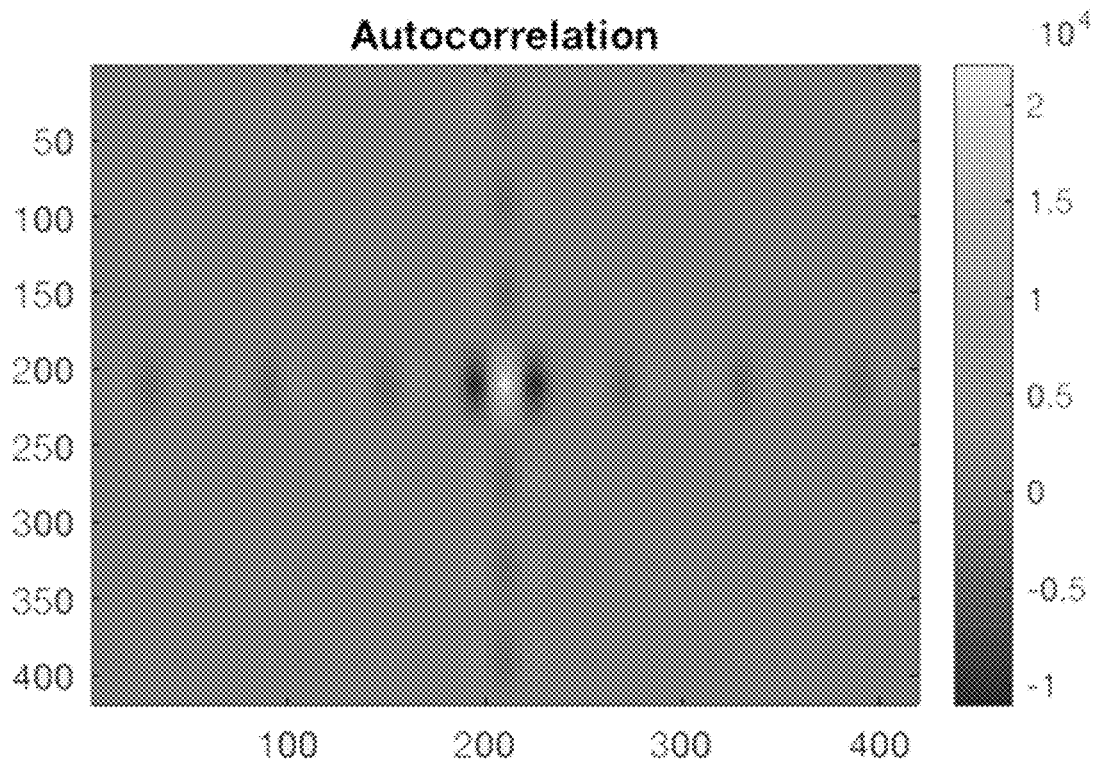
FIG. 14

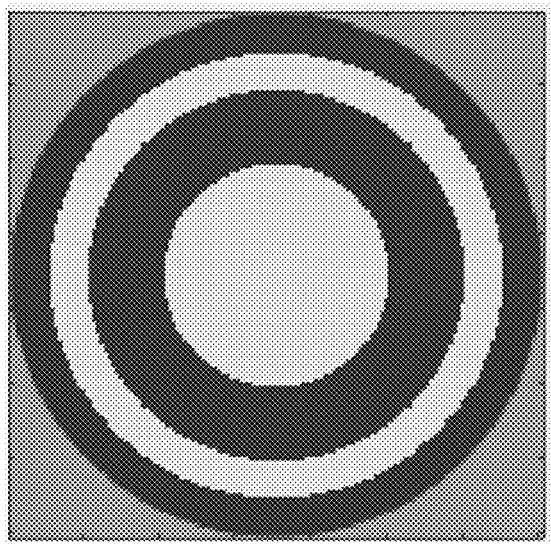
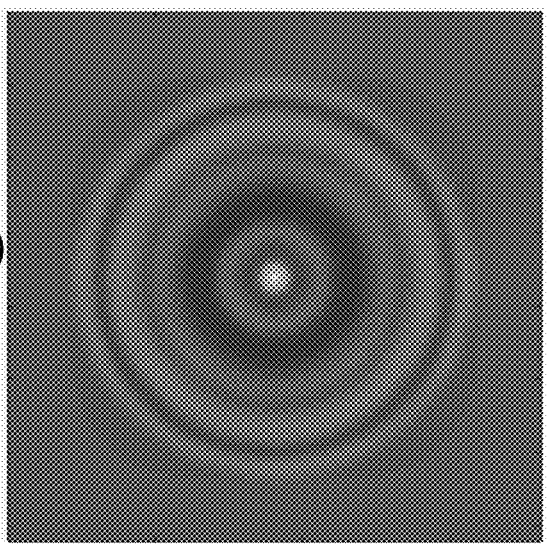
(A)
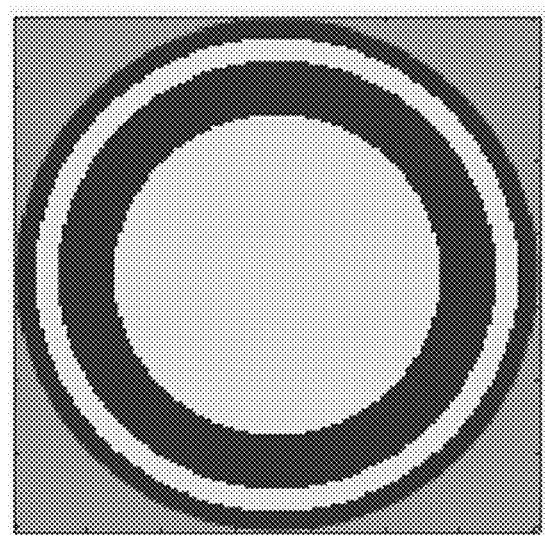
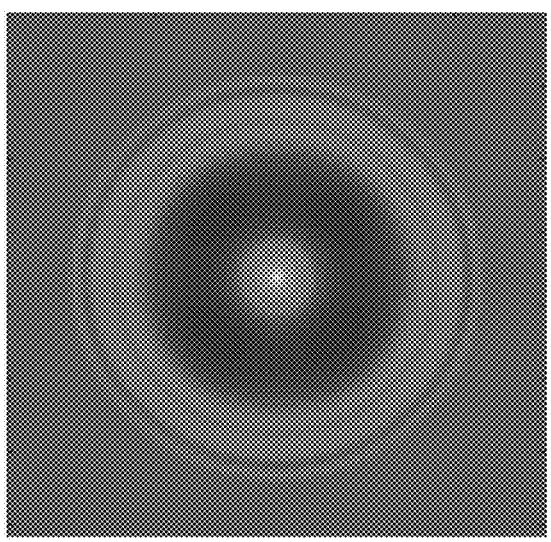
(B)
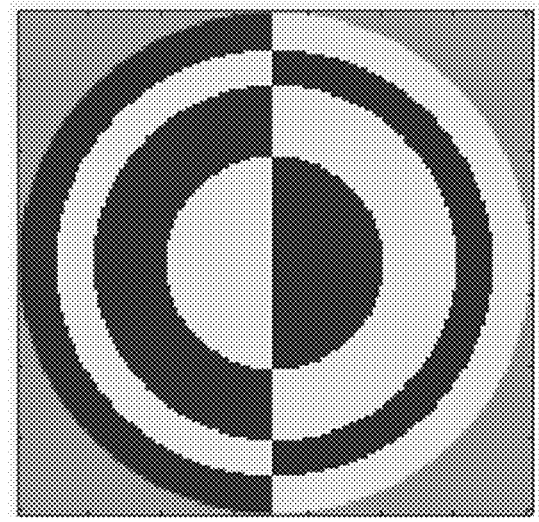
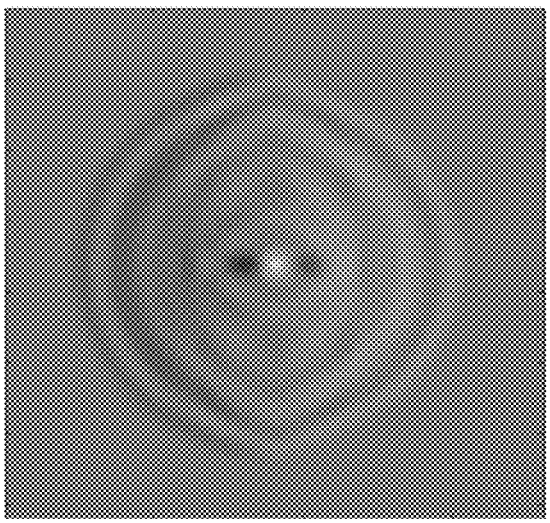
(C)
*FIG. 16*

Image with 2D Barker Code diffraction pattern 50% Attenuation

Correlation Kernel

Correlation matrix

Image with 2D Barker Code diffraction pattern 10% Attenuation

Correlation Kernel

Correlation matrix

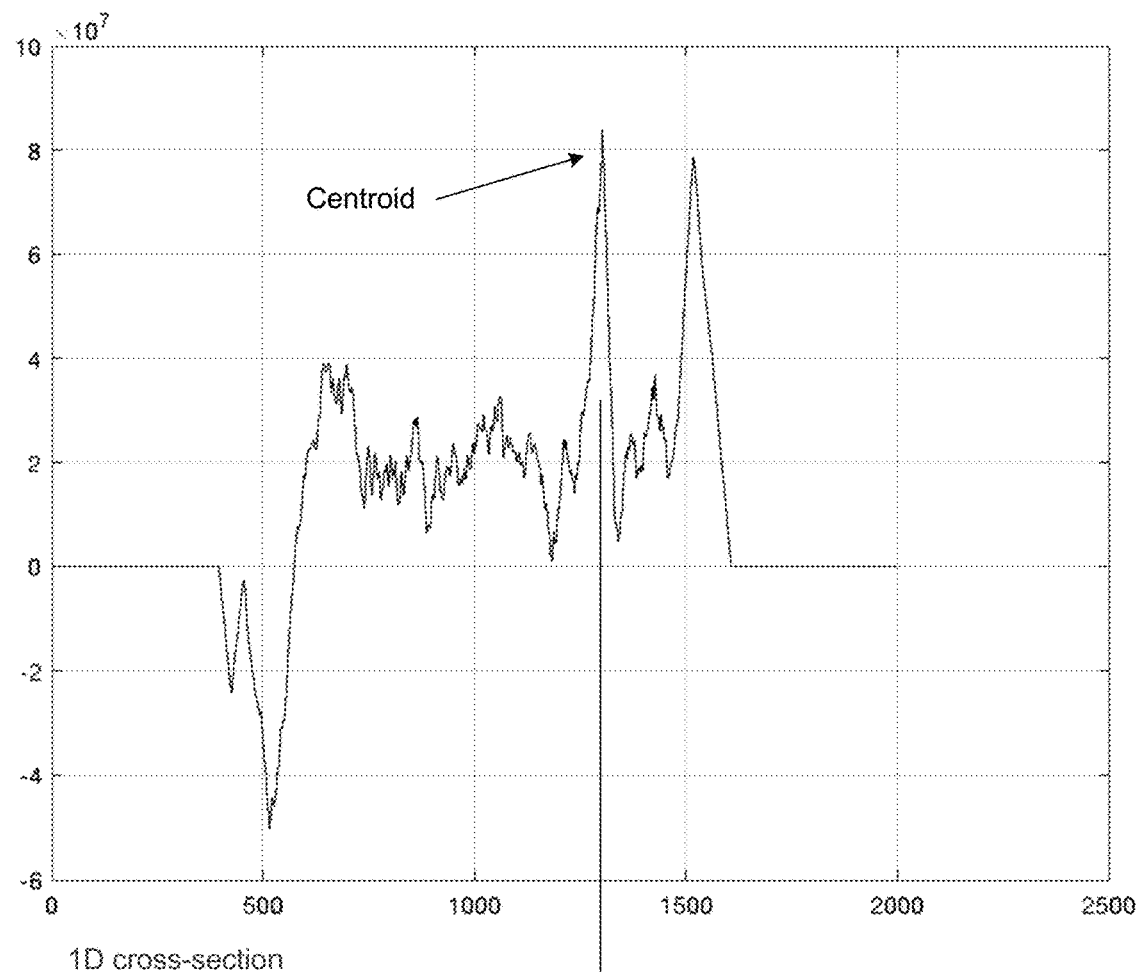
1D cross-section
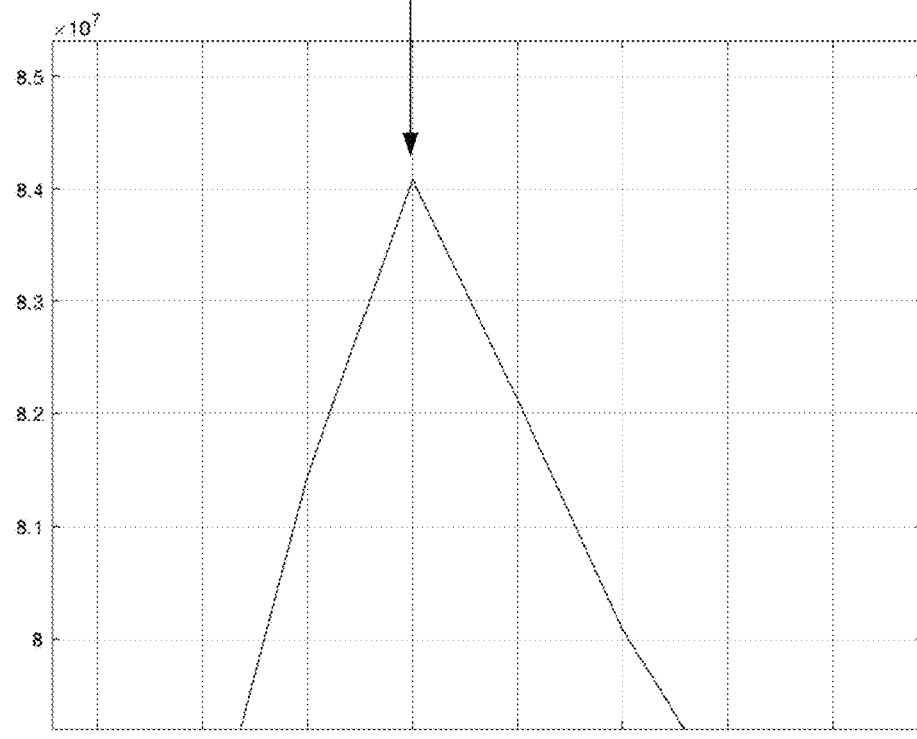
*FIG. 18D*

Sine Modulated Barker Code

Modulation on real image (1% Attenuation)

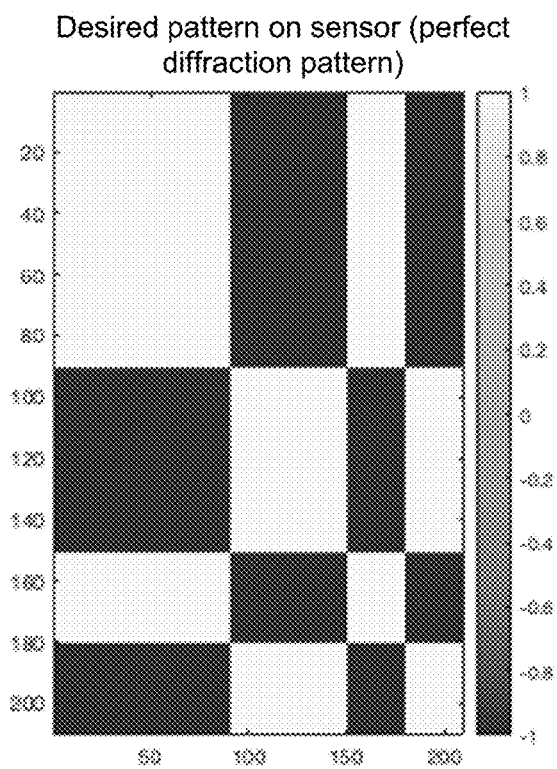
FIG. 24A Desired pattern on sensor (perfect diffraction pattern)
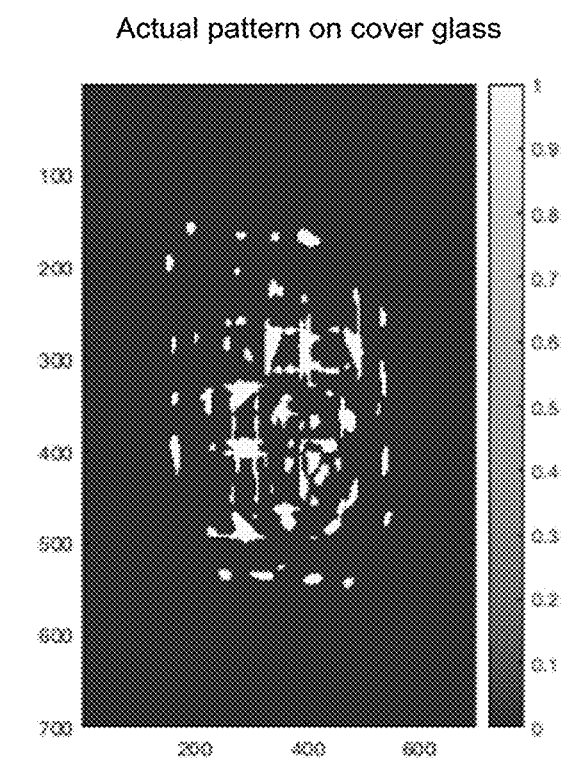
FIG. 24B Actual pattern on cover glass
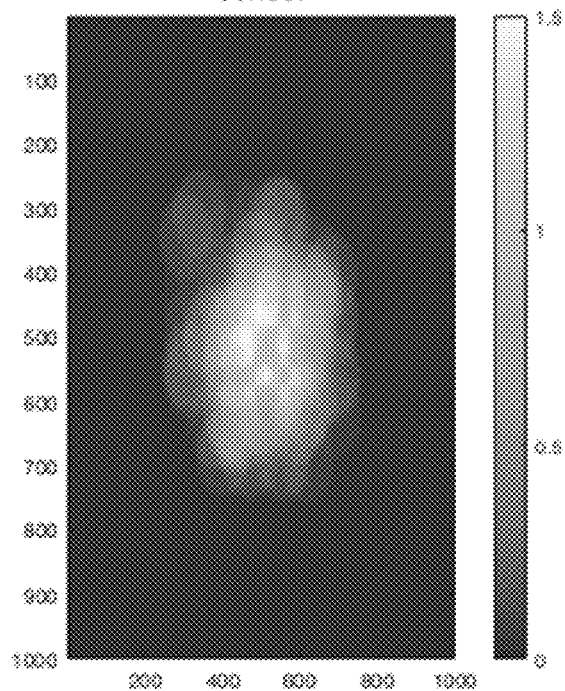
FIG. 24C Obtained diffraction pattern on sensor Desired pattern on sensor (perfect diffraction pattern)

Obtained diffraction pattern on sensor

Actual pattern on cover glass

Correlation peak - ideal

Full pattern on cover glass

Sparse pattern on cover glass

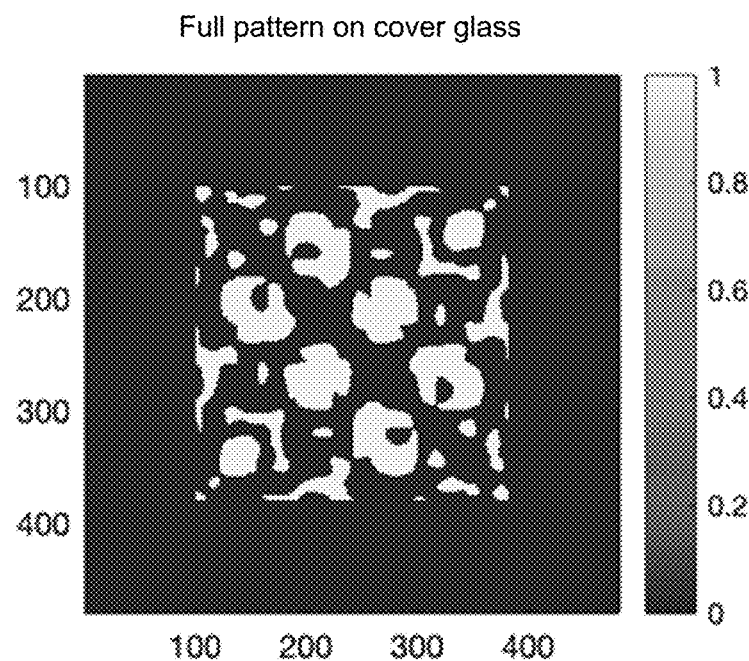
FIG. 27C
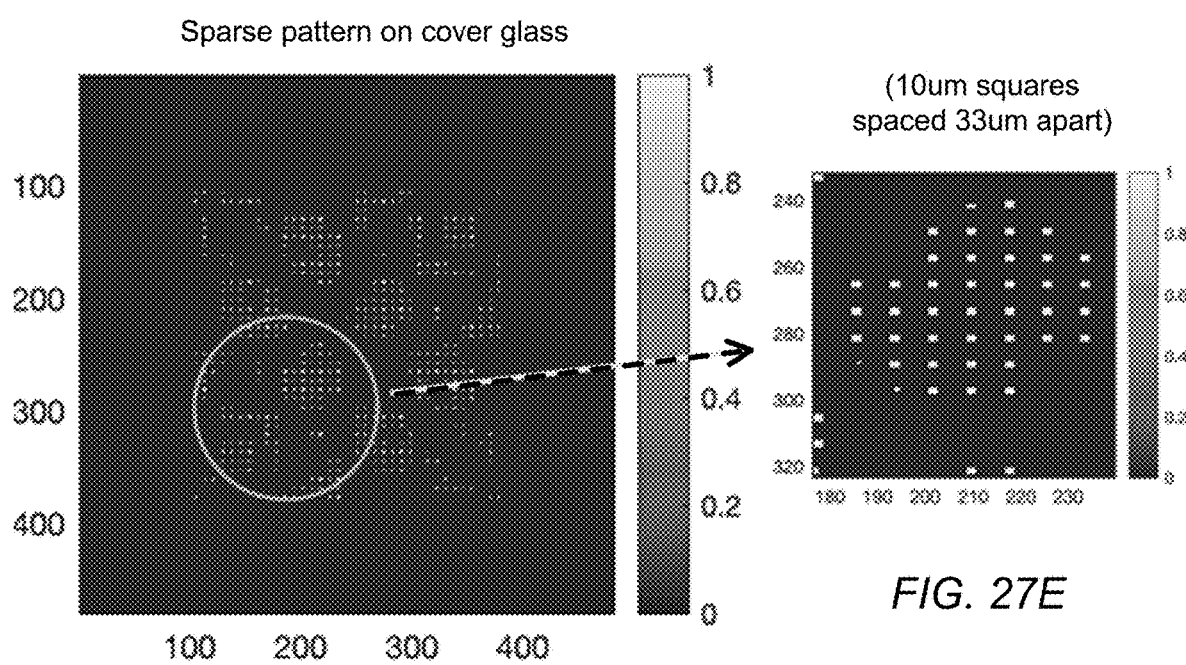
FIG. 27D
FIG. 27E

OBJECT LOCALIZATION SYSTEM

PRIORITY INFORMATION

This application is a continuation of U.S. patent application Ser. No. 17/021,943, filed Sep. 15, 2020, which claims benefit of priority of U.S. Provisional Application Ser. No. 62/907,414 entitled "OBJECT LOCALIZATION SYSTEM" filed Sep. 27, 2019, the content of which is incorporated by reference herein in its entirety.

BACKGROUND

Barker Codes exhibit a unique autocorrelation property—a sharp peak when the received and reference sequence align and near zero values for all other shifts. This impulse-like autocorrelation waveform with maximal sidelobe reduction is ideal for localization. One-dimensional (1D) Barker Codes are, for example, used in radar systems for deriving object range with maximal precision.

SUMMARY

Various embodiments of methods and apparatus for object localization are described. A method to derive object location using two-dimensional (2D) Barker codes is described. 2D Barker codes are described which exhibit similar autocorrelation properties to their 1D counterparts—a sharp peak when the patterns align and near-zero values for all other shifts. Using 2D Barker codes, blurred objects placed extremely close to a camera lens (1 cm away for a camera with 60 cm hyperlocal distance) can be localized within one pixel resolution. In addition, sine-modulated 2D Barker codes are described, and a demodulation method for the sine-modulated 2D Barker codes is described. Sine modulation may improve sensitivity and immunity to background image features. Averaging techniques to further improve signal-to-noise (SNR) are also described.

Embodiments of systems are described in which fiducial patterns that produce 2D Barker code-like diffraction patterns at a camera sensor are etched or otherwise provided on a cover glass (CG) in front of a camera. The fiducial patterns are themselves not 2D barker codes, but are configured to affect light passing through the cover glass to cause the 2D Barker code-like diffraction patterns at the camera sensor. The "object" in the object location methods described herein may be the diffraction patterns as captured in images by the camera. 2D Barker code kernels, when cross-correlated with the diffraction patterns captured in images by the camera, provide sharp cross-correlation peaks. Misalignment of the cover glass with respect to the camera post-$t_0$ (e.g., calibration performed during or after assembly of the system at time 0) can be derived by detecting shifts in the location of the detected peaks with respect to the calibrated locations. Embodiments of systems that include multiple cameras behind a cover glass with one or more fiducials on the cover glass in front of each camera are also described. In these embodiments, the diffraction patterns caused by the fiducials at the various cameras may be analyzed to detect movement or distortion of the cover glass in multiple degrees of freedom.

BRIEF DESCRIPTION OF THE DRAWINGS

FIGS. 5 through 11 show several example 2D Barker codes and their respective autocorrelation patterns that may be used in embodiments.

FIGS. 12 and 13 show example random codes and their respective autocorrelation patterns that may be used in embodiments.

FIG. 14 shows an example sine-modulated 2D Barker code and its respective autocorrelation pattern that may be used in embodiments.

FIG. 16 shows example circular 2D Barker codes that may be used in embodiments.

FIGS. 18A-18D illustrate processing of an image that includes a 2D Barker code diffraction pattern with 10% attenuation, according to some embodiments.

FIGS. 24A-24C illustrate another example 7-bid 2D Barker code pattern that may be used in embodiments.

FIG. 27C illustrates an example full pattern on the cover glass, according to some embodiments.

FIGS. 27D and 27E illustrate an example sparse pattern on the cover glass, according to some embodiments.

Figure 1A:
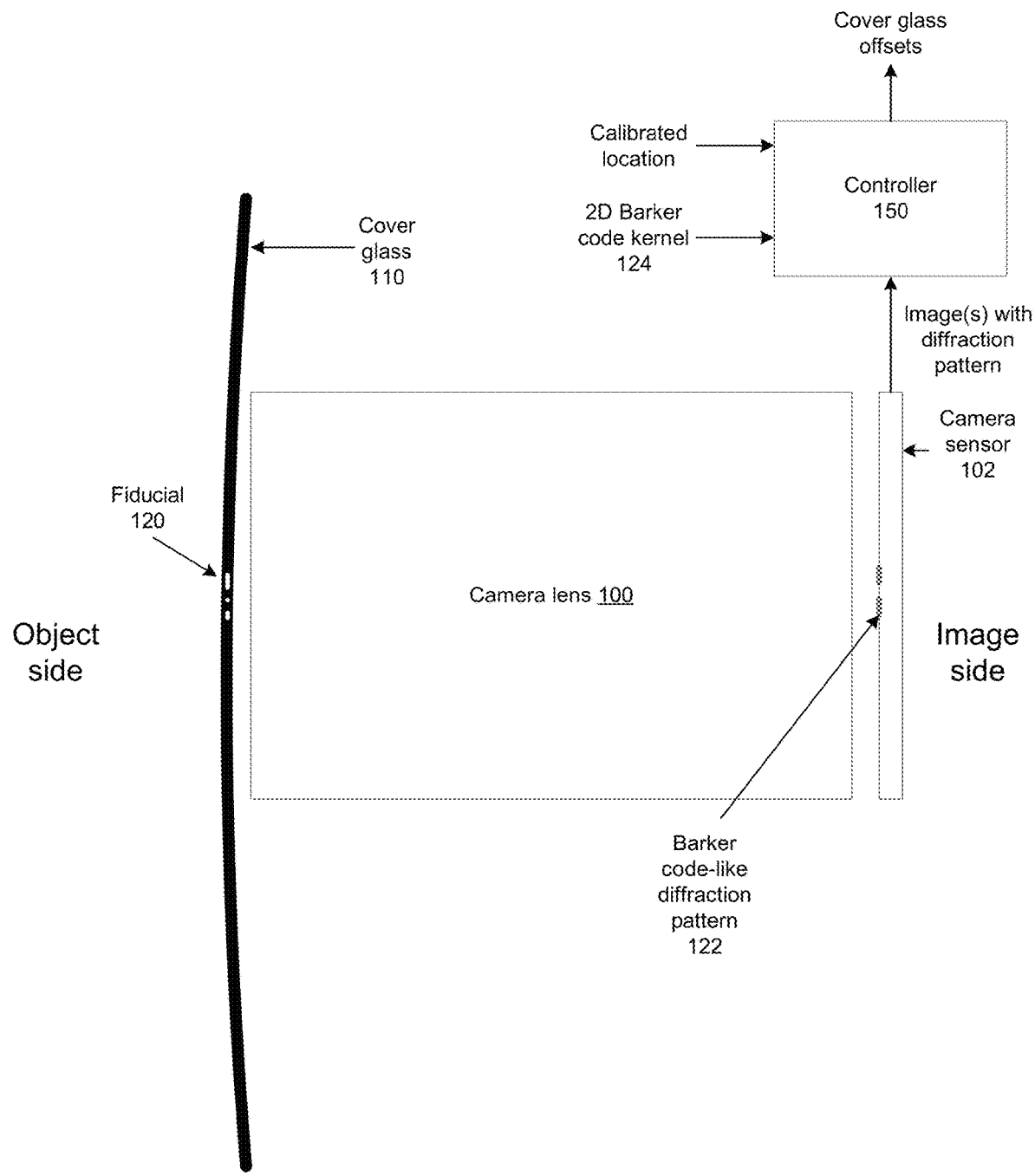
FIG. 1A illustrates a system in which a cover glass includes a fiducial pattern that causes a diffraction pattern on a camera sensor, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for object localization are described. A method to derive object localization using two-dimensional (2D) Barker codes is described. 2D Barker codes are described which exhibit similar auto-correlation properties to their 1D counterparts—a sharp peak when the patterns align and near-zero values for all other shifts. Using 2D Barker codes, blurred objects placed extremely close to a camera lens (1 cm away for a camera with 60 cm hyperlocal distance) can be localized within one pixel resolution. In addition, sine-modulated 2D Barker codes are described, and a demodulation method for the sine-modulated 2D Barker codes is described. Sine modulation may improve sensitivity and immunity to background image features. Averaging techniques to further improve signal-to-noise (SNR) are also described.

Embodiments of systems are described in which fiducial patterns that produce 2D Barker code-like diffraction patterns at a camera sensor are etched or otherwise provided on a cover glass (CG) in front of a camera. The fiducial patterns are themselves not 2D barker codes, but are configured to affect light passing through the cover glass to cause the 2D Barker code-like diffraction patterns at the camera sensor. 2D Barker code kernels, when cross-correlated with the diffraction patterns captured in images by the camera, provide sharp cross-correlation peaks. Misalignment of the cover glass with respect to the camera post-$t_0$ (e.g., calibration performed during or after assembly of the system at time 0) can be derived by detecting shifts in the location of the cross-correlation peaks with respect to the calibrated locations.

Figure 20:
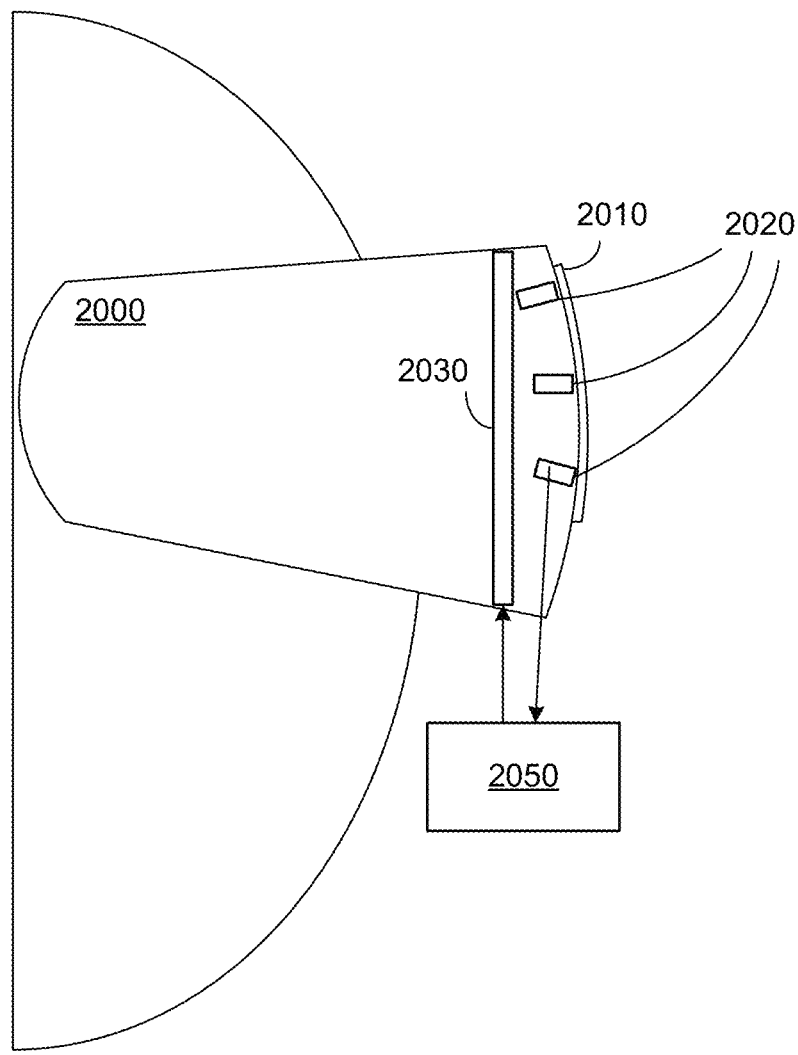
FIG. 20 illustrates an example device in which embodiments may be implemented.

The fiducial patterns and 2D Barker codes described herein may be used in any object localization system, in particular in systems that are within a range (e.g., 0.05 mm-5000 mm) of the camera. Embodiments may, for example, be used for stereo (or more than 2) camera calibration for any product with more than one camera. An example application of the fiducial patterns and 2D Barker codes described herein is in computer-generated reality (CGR) (e.g., virtual or mixed reality) systems that include a device such as headset, helmet, goggles, or glasses worn by the user, which may be referred to herein as a head-mounted device (HMD). FIG. 20 illustrates an example device in which embodiments may be implemented. The device 2000 may include one or more cameras 2020 located behind a flat or curved cover glass 2010. One or more of the cameras 2020 may capture images of the user's environment through the cover glass 2010; the cameras 2020 may include one or more of RGB cameras, infrared (IR) cameras, or other types of cameras or imaging systems. The images captured by the camera(s) 2020 may be processed by algorithms implemented in software and hardware 2050 (e.g., processors (system on a chip (SOC), CPUs, image signal processors (ISPs), graphics processing units (GPUs), encoder/decoders (codecs), etc.), memory, etc.) generate and render frames that include virtual content that are displayed (e.g., on display screen(s) 2030) by the device 2000 for viewing by the user. The image processing software and hardware 2050 may be implemented on the device 2000, on a base station that communicates with the device 2000 via wired and/or wireless connections, or on a combination of the device 2000 and a base station. The image processing algorithms may be sensitive to any distortion in the captured images, including distortion introduced by the cover glass 2010. Alignment of the cover glass 2010 with respect to the camera(s) 2020 may be calibrated at an initial time to, and this cover glass alignment information may be provided to the image processing algorithms to account for any distortion caused by the cover glass 2010. However, the cover glass 2010 may shift or become misaligned with the cameras 2020 during use, for example by bumping or dropping the device 2000.

In embodiments, fiducial patterns that cause 2D Barker code-like diffraction patterns at the camera sensors may be etched or otherwise applied to the cover glass in front of the camera(s) of the device. As necessary (e.g., each time the device is turned on, or upon detecting a sudden jolt or shock to the device), one or more images captured by the camera(s) may be analyzed using corresponding 2D Barker code kernels applied to the image(s) in a cross-correlation process or technique to detect cross-correlation peaks (centroids of the diffraction patterns) in the images. Locations of these centroids may then be compared to the calibrated alignment information for the cover glass to determine shifts of the cover glass with respect to the camera(s) in one or more degrees of freedom.

One or more fiducial patterns may be provided on the cover glass for each camera. Using multiple (e.g., at least three) fiducials for a camera may allow shifts of the cover glass with respect to the camera to be determined in more degrees of freedom.

For a given camera, if more than one fiducial pattern is used for the camera (i.e., etched on the cover glass in front of the camera), the fiducial patterns may be configured to cause effectively the same 2D Barker code diffraction pattern on the camera sensor, or may be configured to cause different 2D Barker code diffraction patterns on the camera sensor. If two or more different 2D Barker code diffraction patterns are used for a camera, a respective 2D Barker code kernel is applied to image(s) captured by the cameras for each diffraction pattern to detect the cross-correlation peak corresponding to the diffraction pattern. Further, the same or different 2D Barker code diffraction patterns may be used for different ones of the device's cameras.

Curvature and thickness of the cover glass may require that the fiducial patterns required to cause the same 2D Barker code diffraction pattern at different locations for a given camera are at least slightly different. Further, the fiducial patterns required to cause the same 2D Barker code diffraction pattern for two different cameras may differ depending on one or more factors including but not limited to curvature and thickness of the cover glass at the cameras, distance of the camera lenses from the cover glass, optical characteristics of the cameras (e.g., F-number, focal length, defocus distance, etc.), and type of camera (e.g., visible light vs. IR cameras). Note that, if a given camera has one or more variable settings (e.g., is a zoom-capable camera and/or has an adjustable aperture stop), the method may require that the camera be placed in a default setting to capture images that include usable 2D Barker code-like diffraction pattern(s) caused by fiducials on the cover glass.

The fiducials on a cover glass effectively cast a shadow on the camera sensor, which shows up in images captured by the camera. If a fiducial is large and/or has high attenuation (e.g., 50% attenuation of input light), the shadow will be easily visible in images captured by the camera and may affect the image processing algorithms. Thus, embodiments of fiducials with very low attenuation (e.g., 1% attenuation of input light) are provided. These low attenuation fiducials (e.g., fiducials corresponding to sine-modulated 2D Barker codes as described herein) cast shadows (2D Barker code-like diffraction patterns) that are barely visible to the naked eye. However, the cross-correlation methods and techniques using 2D Barker code kernels described herein can still detect correlation peaks from these patterns.

In some embodiments, signal processing techniques may be used to extract the correlation peaks for changing background scenes. A constraint is that the background image cannot be easily controlled. An ideal background would be a completely white, uniform background; however, in practice, the background scene may not be completely white or uniform. Thus, signal processing techniques (e.g., filtering and averaging techniques) may be used to account for the possibility of non-ideal backgrounds. In some embodiments, an algorithm may be used that applies spatial frequency filters to remove background scene noise. In some embodiments, averaging may be used to reduce signal-to-noise ratio (SNR) and reduce the effect of shot or Poisson noise. In some embodiments, frames that cannot be effectively filtered are not used in averaging.

In some embodiments, the cross-correlation information may be collected across multiple images and averaged to reduce the signal-to-noise ratio (SNR) and provide more accurate alignment information. Averaging across multiple images may also facilitate using fiducials with low attenuation (e.g., 1% attenuation). Further, analyzing one image provides alignment information at pixel resolution, while averaging across multiple images provides alignment information at sub-pixel resolution.

In some embodiments, cross-correlation peaks from images captured by two or more cameras of the device may be collected and analyzed together to determine overall alignment information for the cover glass. For example, if the cover glass shifts in one direction and the cameras are all stationary, the same shift should be detected across all cameras. If there are differences in the shifts across the cameras, bending or other distortion of the cover glass may be detected.

While embodiments of fiducials etched on a cover glass of a system to cause 2D Barker code-like diffraction patterns at a camera sensor are described in reference to applications for detecting misalignment of the cover glass with a camera of the system, embodiments of fiducials to cause 2D Barker code-like diffraction patterns at a camera sensor may be used in other applications. For example, fiducials may be used to cause patterns that encode information. As an example of encoding information, lens attachments may be provided that go over the cover glass of a system (e.g., of an HMD) to provide optical correction for users with vision problems (myopia, astigmatism, etc.). These lens attachments cause distortions in images captured by the cameras of the system, and as noted above image processing algorithms of the system are sensitive to distortion. One or more fiducials may be etched into the lens attachments that, when analyzed using respective correlation kernels, provide information identifying the respective lens attachment. This information may then be provided to the image processing algorithms so that they can account for the particular distortion caused by the respective lens attachment.

While embodiments of fiducials that produce 2D Barker code-like diffraction patterns are generally described, fiducials that produce other diffraction patterns (e.g., "random" patterns) are also described. Corresponding correlation kernels, when cross-correlated with the diffraction patterns captured in images by the camera, provide cross-correlation peaks. Misalignment of the cover glass with respect to the camera can be derived by detecting shifts in the correlation peaks with respect to the calibrated locations. Further, while embodiments are generally described that involve a cross-correlation technique that applies a respective kernel to a diffraction pattern caused by a fiducial pattern, other correlation techniques may be used in some embodiments.

FIG. 1A illustrates a system in which a cover glass includes a fiducial pattern that causes a diffraction pattern on a camera sensor, according to some embodiments. The system may include a camera that includes a camera lens 100 and camera sensor 102 located behind a cover glass 110 of the system (e.g., a cover glass 110 of a head-mounted device (HMD)). The cover glass 110 may be, but is not necessarily, curved. A fiducial 120 may be etched or otherwise applied to or integrated in the cover glass 110 in front of the camera lens 100. The fiducial 120 is configured to affect input light from an object field in front of the camera to cause a 2D Barker code-like diffraction pattern 122 at an image plane corresponding to a surface of the camera sensor 102. Images captured by the camera sensor 102 contain a "shadow" that corresponds to the 2D Barker code-like diffraction pattern 122 caused by the fiducial 120.

The system may also include a controller 150. The controller 150 may be implemented in the HMD, or alternatively may be implemented at least in part by an external device (e.g., a computing system) that is communicatively coupled to the HMD via a wired or wireless interface. The controller 150 may include one or more of various types of processors, image signal processors (ISPs), graphics processing units (GPUs), coder/decoders (codecs), and/or other components for processing and rendering video and/or images. While not shown, the system may also include memory coupled to the controller 150. The controller 150 may, for example, implement algorithms that render frames that include virtual content based at least in part on inputs obtained from one or more cameras and other sensors on the HMD, and may provide the frames to a projection system of the HMD for display. The controller 150 may also implement other functionality of the system, for example eye tracking algorithms.

The image processing algorithms implemented by controller 150 may be sensitive to any distortion in images captured by the camera, including distortion introduced by the cover glass 110. Alignment of the cover glass 110 with respect to the camera may be calibrated at an initial time $t_0$, and this alignment information may be provided to the image processing algorithms to account for any distortion caused by the cover glass 110. However, the cover glass 110 may shift or become misaligned with the camera during use, for example by bumping or dropping the HMD.

The controller 150 may also implement methods for detecting shifts in the cover glass 110 post-$t_0$ based on the 2D Barker code-like diffraction pattern 122 caused by the fiducial 120 on the cover glass 110 and on a corresponding 2D Barker code kernel 124. These algorithms may, for example be executed each time the HMD is turned on, or upon detecting a sudden jolt or shock to the HMD. One or more images captured by the camera may be analyzed by controller 150 by applying the 2D Barker code kernel 124 to the image(s) in a cross-correlation process to detect a cross-correlation peak (centroid of the diffraction pattern 122) in the image(s). The location of the detected centroid may then be compared to the calibrated location for the cover glass 110 to determine shift of the cover glass 110 with respect to the camera in one or more degrees of freedom. Cover glass offsets from the calibrated location determined from the shift may then be provided to the image processing algorithms to account for any distortion in images captured by the camera caused by the shifted cover glass 110.

In some embodiments, the cross-correlation information may be collected across multiple images and averaged to reduce the signal-to-noise ratio (SNR) and provide more accurate alignment information. Averaging across multiple images may also facilitate using fiducials 120 with low attenuation (e.g., 1% attenuation). Further, analyzing one image provides alignment information at pixel resolution, while averaging across multiple images provides alignment information at sub-pixel resolution.

While embodiments of fiducials 120 that produce 2D Barker code-like diffraction patterns 122 are generally described, fiducials 120 that produce other diffraction patterns 122 (e.g., "random" patterns) are also described. Corresponding correlation kernels 124, when cross-correlated with the diffraction patterns 122 captured in images by the camera, provide cross-correlation peaks that may be used to detect shifts in the cover glass 110.

Figure 1B:
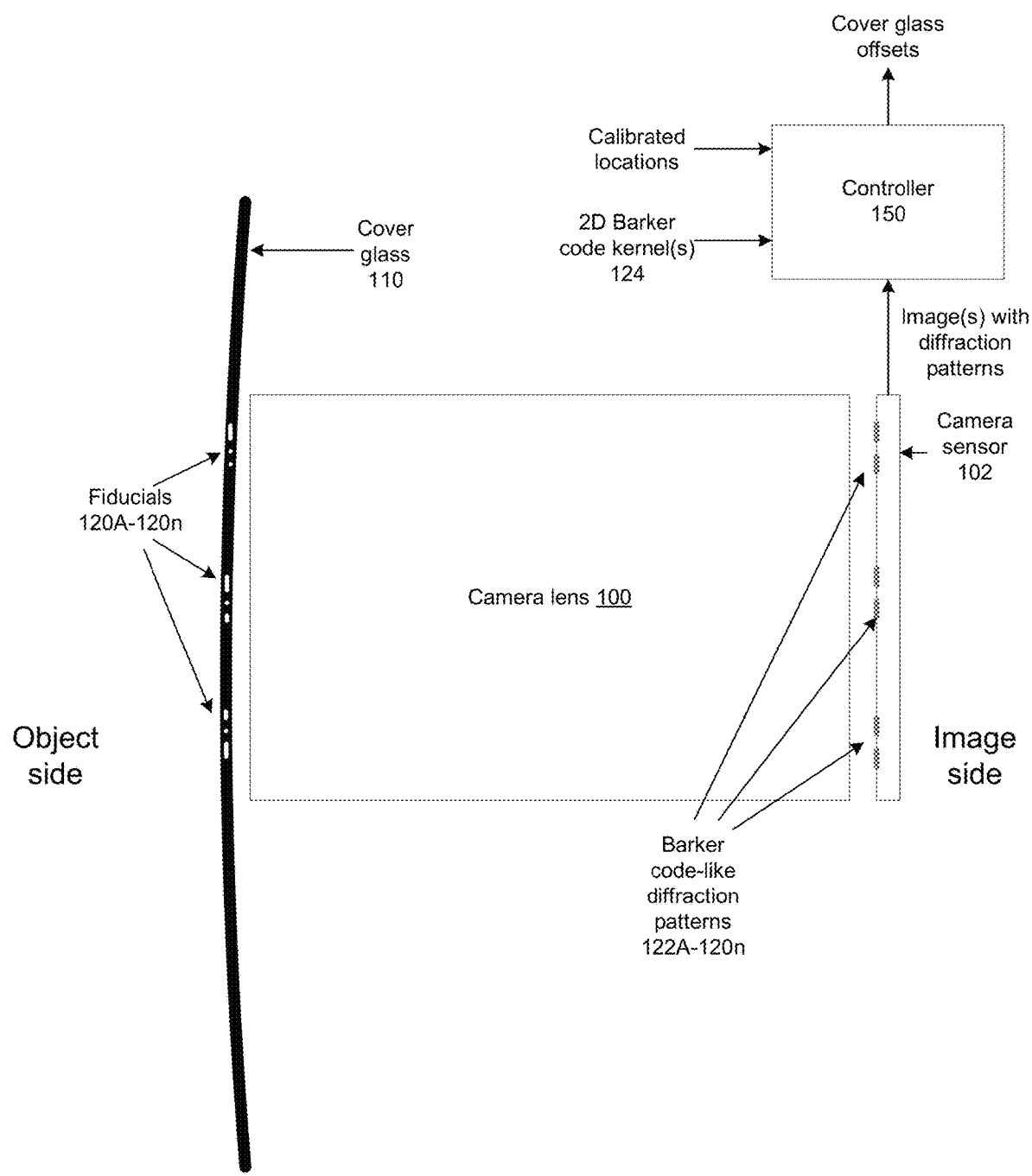
FIG. 1B illustrates a system in which a cover glass includes multiple fiducial patterns that cause diffraction patterns on a camera sensor, according to some embodiments.

FIG. 1B illustrates a system in which a cover glass includes multiple fiducial patterns that cause diffraction patterns on a camera sensor, according to some embodiments. The system may include a camera that includes a camera lens 100 and camera sensor 102 located behind a cover glass 110 of the system (e.g., a cover glass 110 of a head-mounted device (HMD)). The cover glass 110 may be, but is not necessarily, curved. Multiple fiducials 120A-120$n$ may be etched or otherwise applied to or integrated in the cover glass 110 in front of the camera lens 100. The fiducials 120 are configured to affect input light from an object field in front of the camera to cause 2D Barker code-like diffraction patterns 122A-122$n$ at an image plane corresponding to a surface of the camera sensor 102. Images captured by the camera sensor 102 contain "shadows" that correspond to the 2D Barker code-like diffraction patterns 122A-122$n$ caused by the fiducials 120A-120$n$.

One or more images captured by the camera may be analyzed by controller 150 by applying 2D Barker code kernel(s) 124 to the image(s) in a cross-correlation process to detect centroids of the diffraction patterns 122A-122$n$ in the image(s). The location of the detected centroids may then be compared to the calibrated locations for the cover glass 110 to determine shift of the cover glass 110 with respect to the camera in multiple degrees of freedom. Cover glass offsets determined from the shift may then be provided to the image processing algorithms to account for any distortion in images captured by the camera caused by the shifted cover glass 110.

Using multiple fiducials 120A-120$n$ for a camera may allow shifts of the cover glass with respect to the camera to be determined in more degrees of freedom than using just one fiducial 120.

The fiducials 120A-120$n$ may be configured to cause effectively the same 2D Barker code diffraction pattern 122 on the camera sensor 102, or may be configured to cause different 2D Barker code diffraction patterns 122 on the camera sensor 102. If two or more different 2D Barker code diffraction patterns 122 are used for a camera, a respective 2D Barker code kernel 124 is applied to image(s) captured by the cameras for each diffraction pattern 122 to detect the cross-correlation peak corresponding to the diffraction pattern 122.

Curvature and thickness of the cover glass 110 may require that the fiducial patterns 120 required to cause the same 2D Barker code diffraction pattern 122 at different locations for the camera are at least slightly different.

Figure 1C:
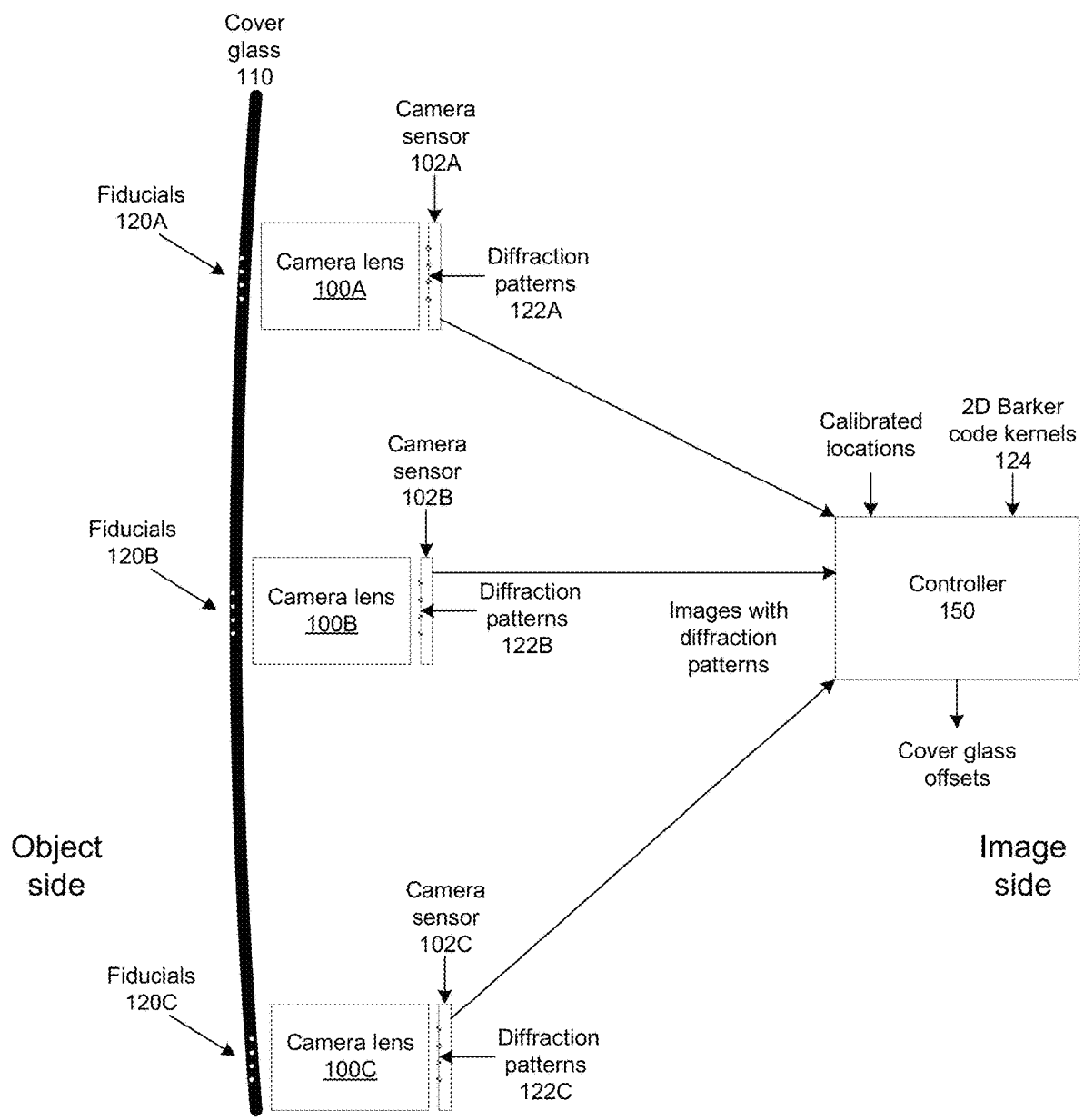
FIG. 1C illustrates a system with multiple cameras in which a cover glass includes multiple fiducial patterns that cause diffraction patterns on the camera sensors, according to some embodiments.

FIG. 1C illustrates a system with multiple cameras in which a cover glass includes multiple fiducial patterns that cause diffraction patterns on the respective camera sensors, according to some embodiments. The system may include two or more cameras (three, in this example) each including a camera lens (100A-100C) and camera sensor (102A-102C) located behind a cover glass 110 of the system (e.g., a cover glass 110 of a head-mounted device (HMD)). The cover glass 110 may be, but is not necessarily, curved. Fiducials 120A-120C may be etched or otherwise applied to or integrated in the cover glass 110 in front of respective camera lenses 100A-100C. The fiducials 120 for a given camera are configured to affect input light from an object field in front of the camera to cause 2D Barker code-like diffraction patterns 122 at an image plane corresponding to a surface of the respective camera sensor 102. Images captured by the camera sensor 102 contain "shadows" that correspond to the 2D Barker code-like diffraction patterns 122 caused by the respective fiducials 120.

The fiducial patterns 120 required to cause the same 2D Barker code diffraction pattern for two different cameras may differ depending on one or more factors including but not limited to curvature and thickness of the cover glass 110 at the cameras, distance of the camera lenses 100 from the cover glass 100, optical characteristics of the cameras (e.g., F-number, focal length, defocus distance, etc.), and type of camera (e.g., visible light vs. IR cameras).

One or more images captured by a camera may be analyzed by controller 150 by applying 2D Barker code kernel(s) 124 to the image(s) in a cross-correlation process to detect centroids of the diffraction patterns 122 in the image(s). The location of the detected centroids may then be compared to the calibrated locations for the cover glass 110 to determine shift of the cover glass 110 with respect to the camera in multiple degrees of freedom. Cover glass offsets determined from the shift may then be provided to the image processing algorithms to account for any distortion in images captured by the camera caused by the shifted cover glass 110.

In some embodiments, cross-correlation peaks from images captured by two or more of the cameras in the system may be collected and analyzed by controller 150 together to determine overall alignment information for the cover glass 110. For example, if the cover glass 110 shifts in one direction and the cameras are all stationary, the same shift should be detected across all cameras. If there are differences in the shifts across the cameras, bending or other distortion of the cover glass 110 may be detected.

Figure 2A:
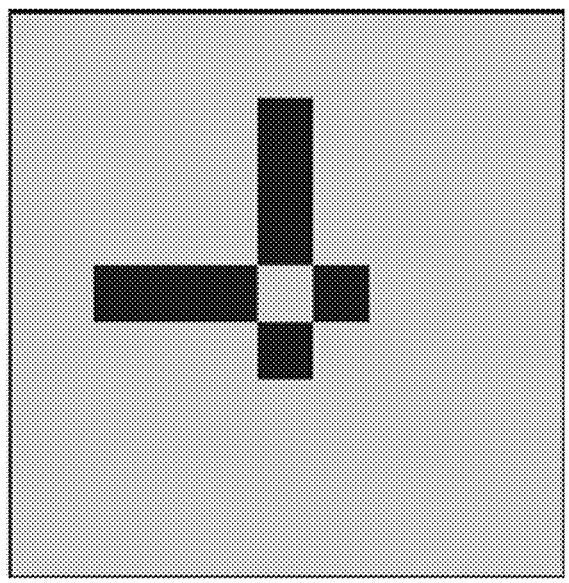
FIG. 2A illustrates an example 2D Barker code pattern, according to some embodiments.
Figure 2B:
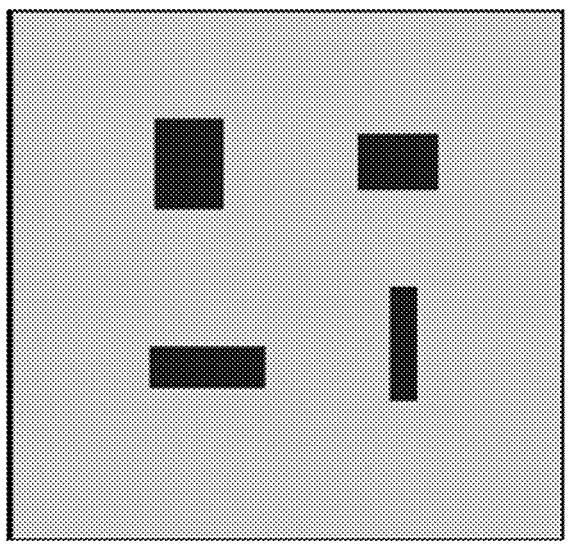
FIG. 2B illustrates an example fiducial pattern that causes a 2D Barker code-like diffraction pattern on a camera sensor, according to some embodiments.
Figure 2C:
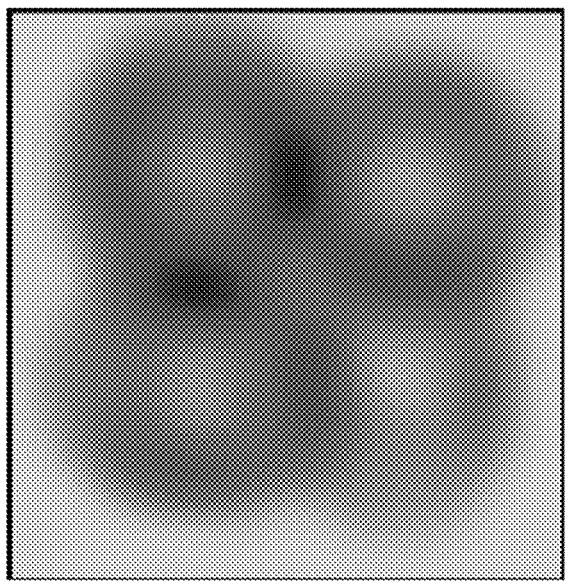
FIG. 2C illustrates an example 2D Barker code-like diffraction pattern on a camera sensor, according to some embodiments.

FIGS. 2A through 2C illustrate obtaining a 2D Barker code-like diffraction pattern at a camera sensor, according to some embodiments. FIG. 2A illustrates an example 2D Barker code pattern that is desired to be obtained as a diffraction pattern at the camera sensor. FIG. 2B shows an example fiducial pattern that may be etched or otherwise applied to a cover glass to affect light passing through the cover glass in order to obtain the desired 2D Barker code-like diffraction pattern at the camera sensor. Note that the fiducial pattern is not itself a 2D Barker code. FIG. 2C shows an example 2D Barker code-like diffraction pattern that may be obtained at the camera sensor using the example fiducial pattern shown in FIG. 2B.

Figure 3:
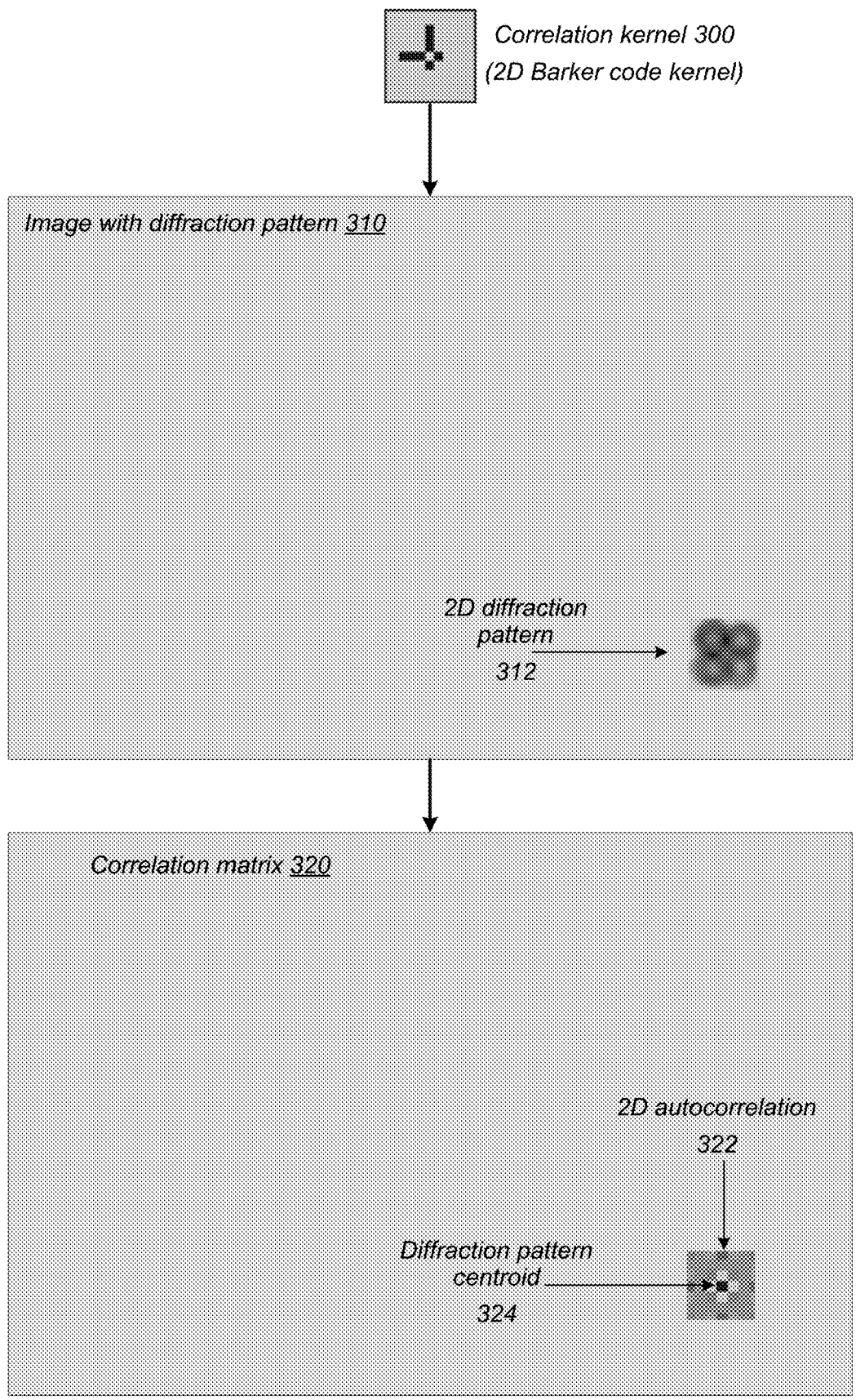
FIG. 3 illustrates applying a correlation kernel to a captured image that contains a 2D Barker code-like diffraction pattern to locate a cross-correlation pattern with a well-defined centroid, according to some embodiments.

FIG. 3 illustrates applying a correlation kernel to a captured image that contains a 2D Barker code-like diffraction pattern to locate a cross-correlation pattern with a well-defined centroid, according to some embodiments. Using FIGS. 2A-2C as an example, a correlation kernel 300 corresponding to the 2D Barker code shown in FIG. 2A may be applied in an autocorrelation process to an image 310 containing the diffraction pattern 312 shown in FIG. 2B to precisely locate the centroid 324 of the diffraction pattern. The autocorrelation process may generate a correlation matrix 320 that includes a 2D autocorrelation 322 corresponding to the diffraction pattern 312. A peak in the 2D autocorrelation 322 may then be identified as the diffraction pattern centroid 324.

Figure 4A:
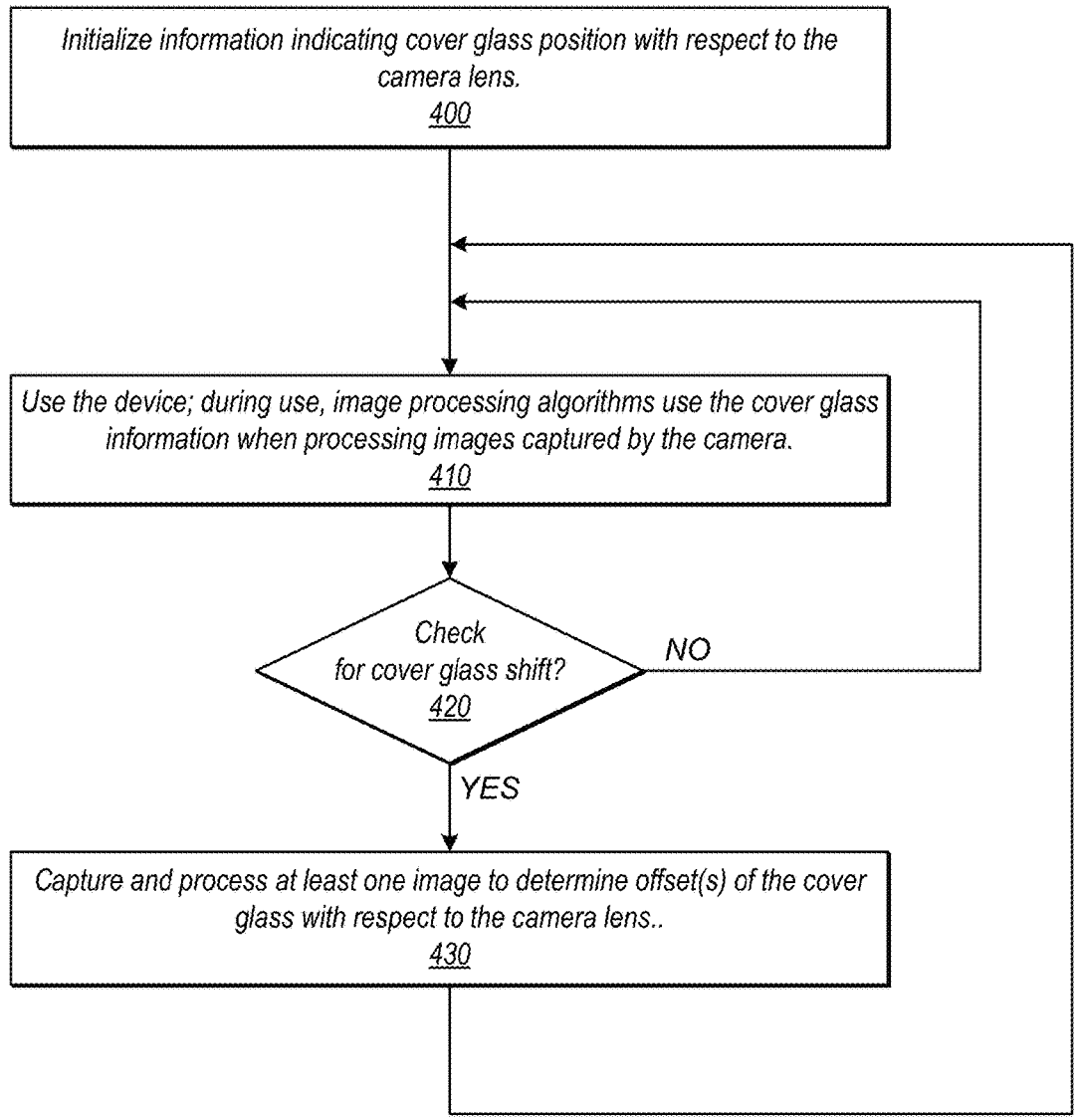
FIG. 4A is a flowchart of a method for checking for shifts in the cover glass of a system, according to some embodiments.

FIG. 4A are flowcharts of methods for detecting shifts in the cover glass of a device using fiducials on the cover glass that cause diffraction patterns in images captured by cameras of the device, according to some embodiment. The methods of FIGS. 4A and 4B may, for example, be implemented in the systems as illustrated in FIGS. 1A through 1C.

FIG. 4A is a flowchart of a method for checking for shifts in the cover glass of a device relative to a camera of the device, according to some embodiments. As indicated at 400, information indicating cover glass position with respect to the camera lens may be initialized, for example during a calibration of the device performed during or after manufacturing. As indicated at 410, during use, algorithms (e.g., image processing algorithms) may use the cover glass information when processing images captured by the camera. At 420, the device may detect an event that might affect alignment of the cover glass with respect to the camera lens and that thus may require a check to determine if the cover glass has shifted. For example, the device may detect a sudden shock, for example due to dropping or bumping the device. As another example, a check may be performed each time the device is powered on. If an event is detected that requires a check, then at 430 at least one image may be captured and processed to determine offset(s) of the cover glass with respect to the camera lens.

Figure 4B:
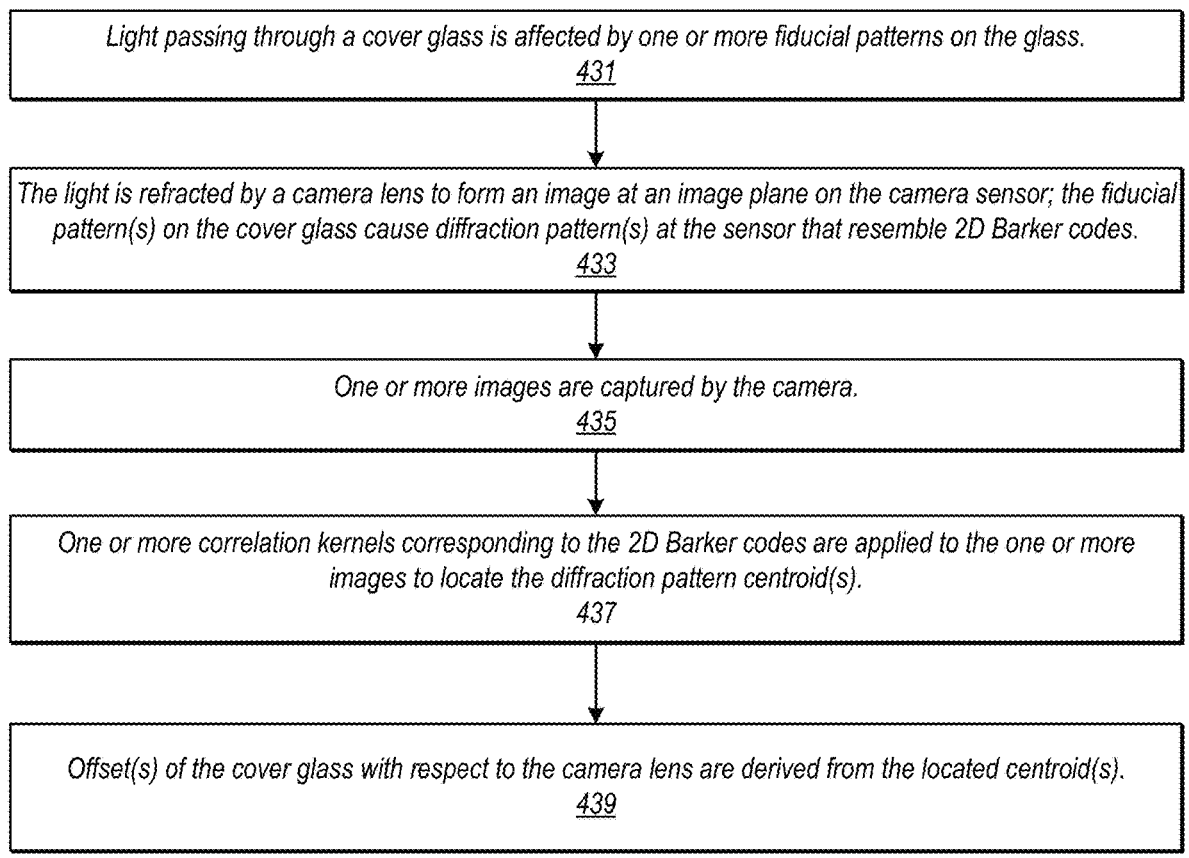
FIG. 4B is a flowchart of a method for deriving cover glass offset(s) from diffraction patterns causes by fiducials on the cover glass, according to some embodiments.

FIG. 4B is a flowchart of a method for deriving cover glass offset(s) from 2D Barker code-like diffraction patterns causes by fiducials on the cover glass, according to some embodiments. The method of FIG. 4A may, for example, be implemented at element 430 of FIG. 4A. As indicated at 431, light passing through a cover glass in front of a camera is affected by one or more fiducial patterns on the cover glass. As indicated at 433, the light is refracted by a camera lens to form an image at an image plane on the camera sensor; the fiducial pattern(s) on the cover glass cause diffraction pattern(s) at the sensor that resemble 2-D Barker codes. As indicated at 435, one or more images are captured by the camera. As indicated at 437, one or more correlation kernels corresponding to the 2D Barker codes are applied to the one or more images to locate the diffraction pattern centroid(s). If sine-modulated Barker codes are being used, the captured image(s) may be demodulated using a demodulation method prior to applying the correlation kernels. As indicated at 437, offset(s) of the cover glass with respect to the camera lens are derived from the located centroid(s). In some embodiments, the location of the detected centroids may be compared to the calibrated locations for the cover glass to determine shift of the cover glass with respect to the camera in multiple degrees of freedom. The determined cover glass offsets may be provided to one or more image processing algorithms to account for any distortion in images captured by the camera caused by the shifted cover glass.

FIGS. 5 through 11 show several example 2D Barker codes that may be used in embodiments and their respective 2D autocorrelation patterns when applied to respective 2D Barker code-like diffraction patterns caused by respective fiducials. The respective fiducial patterns are not shown. Note that the fiducial patterns required to cause the same 2D Barker code-like diffraction pattern may differ depending on one or more factors including but not limited to curvature and thickness of the cover glass, distance of the camera lenses from the cover glass, optical characteristics of the camera (e.g., F-number, focal length, defocus distance, etc.), and type of camera (e.g., visible light vs. IR cameras). FIG.

5 shows a 2×2 2D Barker code and its respective 2D autocorrelation pattern. FIG. 6 shows a 3×3 2D Barker code and its respective 2D autocorrelation pattern. FIG. 7 shows a 4×4 2D Barker code and its respective 2D autocorrelation pattern. FIG. 8 shows a 5×5 2D Barker code and its respective 2D autocorrelation pattern. FIG. 9 shows a 7×7 2D Barker code and its respective 2D autocorrelation pattern. FIG. 10 shows a 13×13 2D Barker code and its respective 2D autocorrelation pattern.

FIG. 11 shows a cyclic 2D Barker code and its respective 2D autocorrelation pattern. A cyclically shifted 2D Barker code as shown in FIG. 11 may generate multiple peaks.

FIGS. 12 and 13 show example random (non-Barker) codes that may be used in embodiments and their respective 2D autocorrelation patterns. FIG. 12 shows a 7×7 2D random code and its respective 2D autocorrelation pattern. FIG. 13 shows a 13×13 2D random code and its respective 2D autocorrelation pattern.

FIG. 14 shows an example sine-modulated 2D Barker code that may be used in embodiments and its respective autocorrelation pattern. Sine-modulated 2D Barker codes may improve signal-to-noise ratio (SNR) when processing images containing diffraction patterns corresponding to the sine-modulated 2D Barker codes caused by respective fiducial patterns (not shown). Using sine-modulated 2D Barker codes may also reduce influence on the background image content caused by respective fiducial patterns. Sine-modulated 2D Barker codes may also perform well while providing low attenuation (e.g., 1% attenuation) caused by respective fiducial patterns.

Figure 15A:
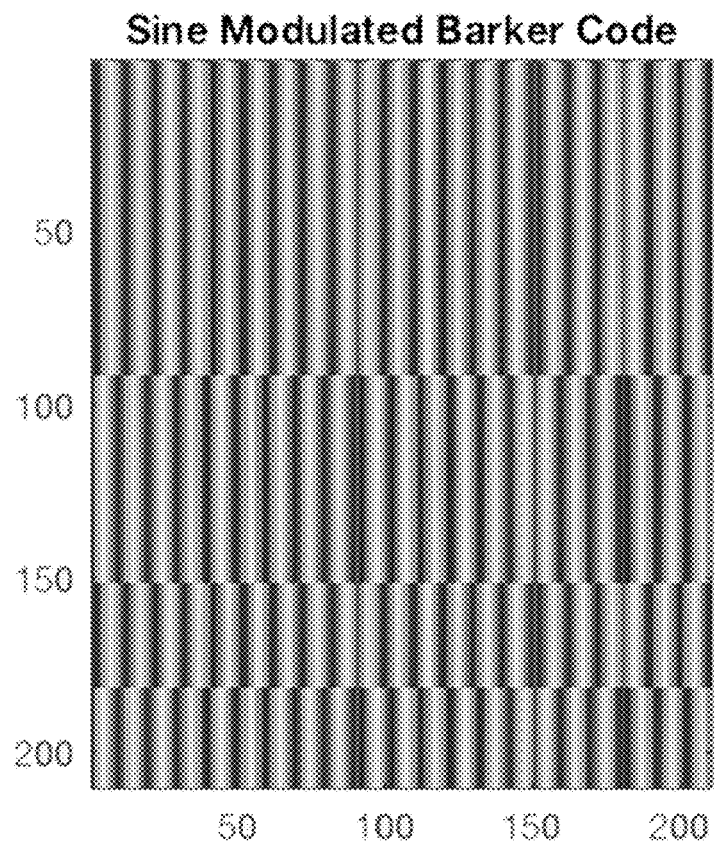
FIGS. 15A-15C show an example sine-modulated 2D Barker code and its respective autocorrelation pattern that may be used in embodiments.
Figure 15B:
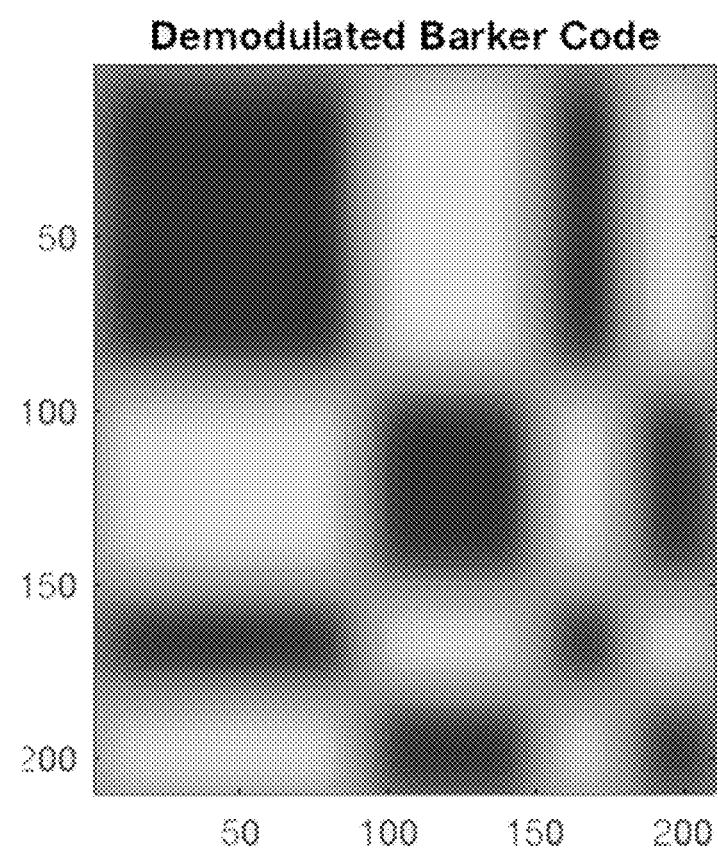
Figure 15C:
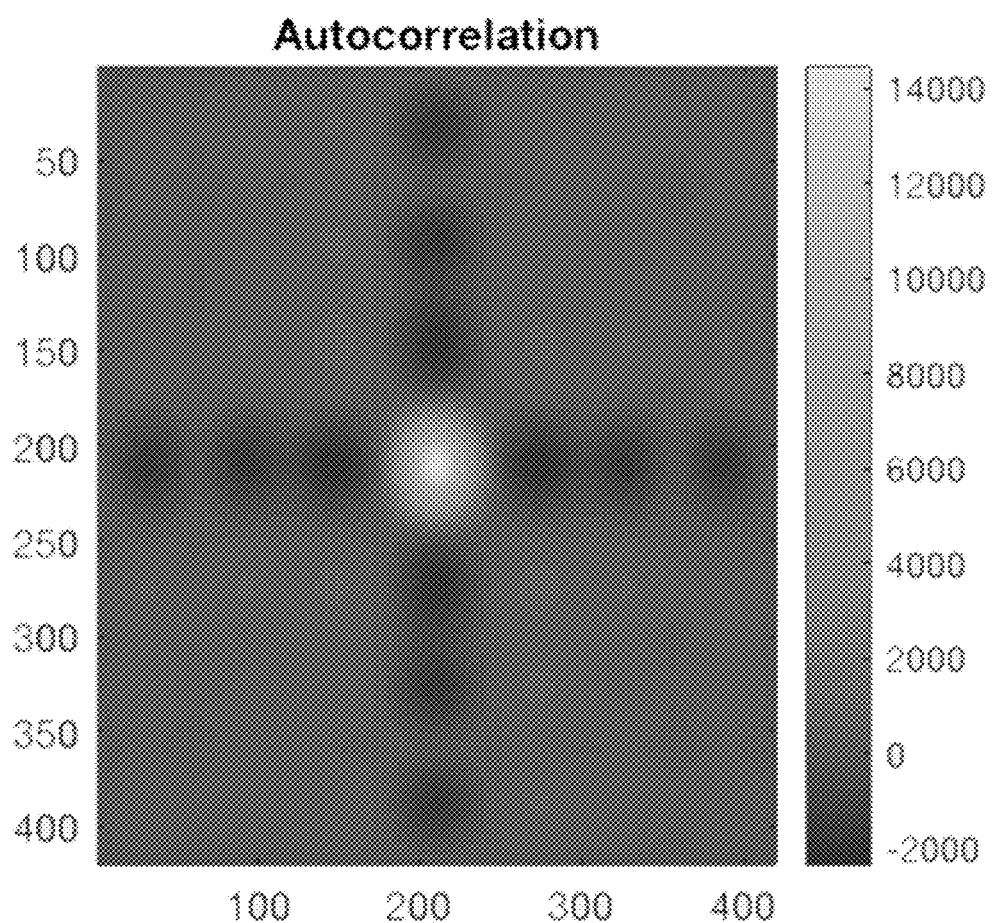

FIGS. 15A-15C show an example sine-modulated 2D Barker code that may be used in embodiments and its respective autocorrelation pattern. FIG. 15A shows an example sine-modulated 2D Barker code. A demodulation process may be applied to an image that contains a sine-modulated 2D Barker code-like diffraction pattern to generate a demodulated 2D Barker code, as shown in FIG. 15B. FIG. 15C shows an autocorrelation pattern obtained from the demodulated 2D Barker code shown in FIG. 15B by applying a respective 2D Barker code kernel to the demodulated image.

FIG. 16 shows example circular 2D Barker codes that may be used in embodiments and their respective autocorrelation patterns. FIG. 16 (A) shows a basic circular Barker code and its respective autocorrelation pattern. FIG. 16 (B) shows a radius correct circular Barker code and its respective autocorrelation pattern. FIG. 16 (C) shows a "flipped" circular Barker code and its respective autocorrelation pattern. While FIG. 16 shows example circular 2D Barker codes, circular random (non-Barker) codes may also be used.

Figure 17A:
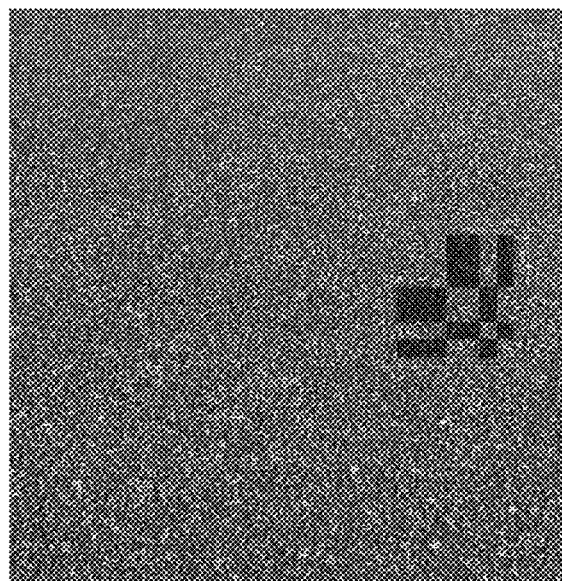
FIGS. 17A-17D illustrate processing of an image that includes a 2D Barker code diffraction pattern with 50% attenuation, according to some embodiments.
Figure 17B:
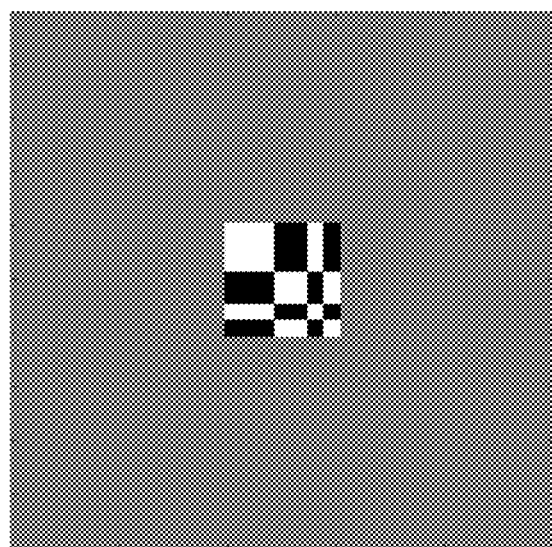
Figure 17C:
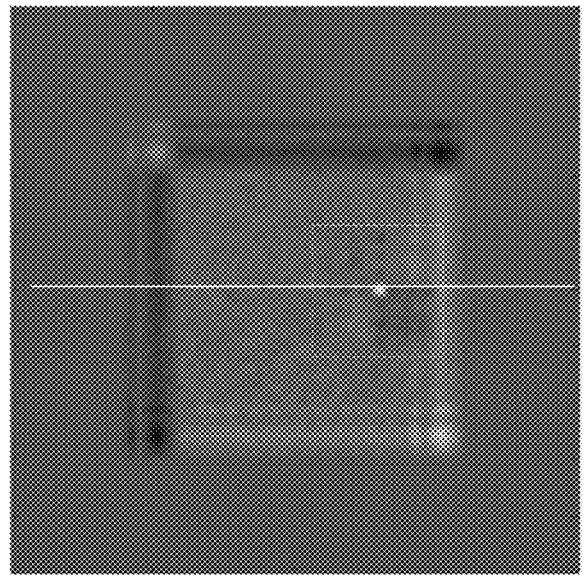
Figure 17D:
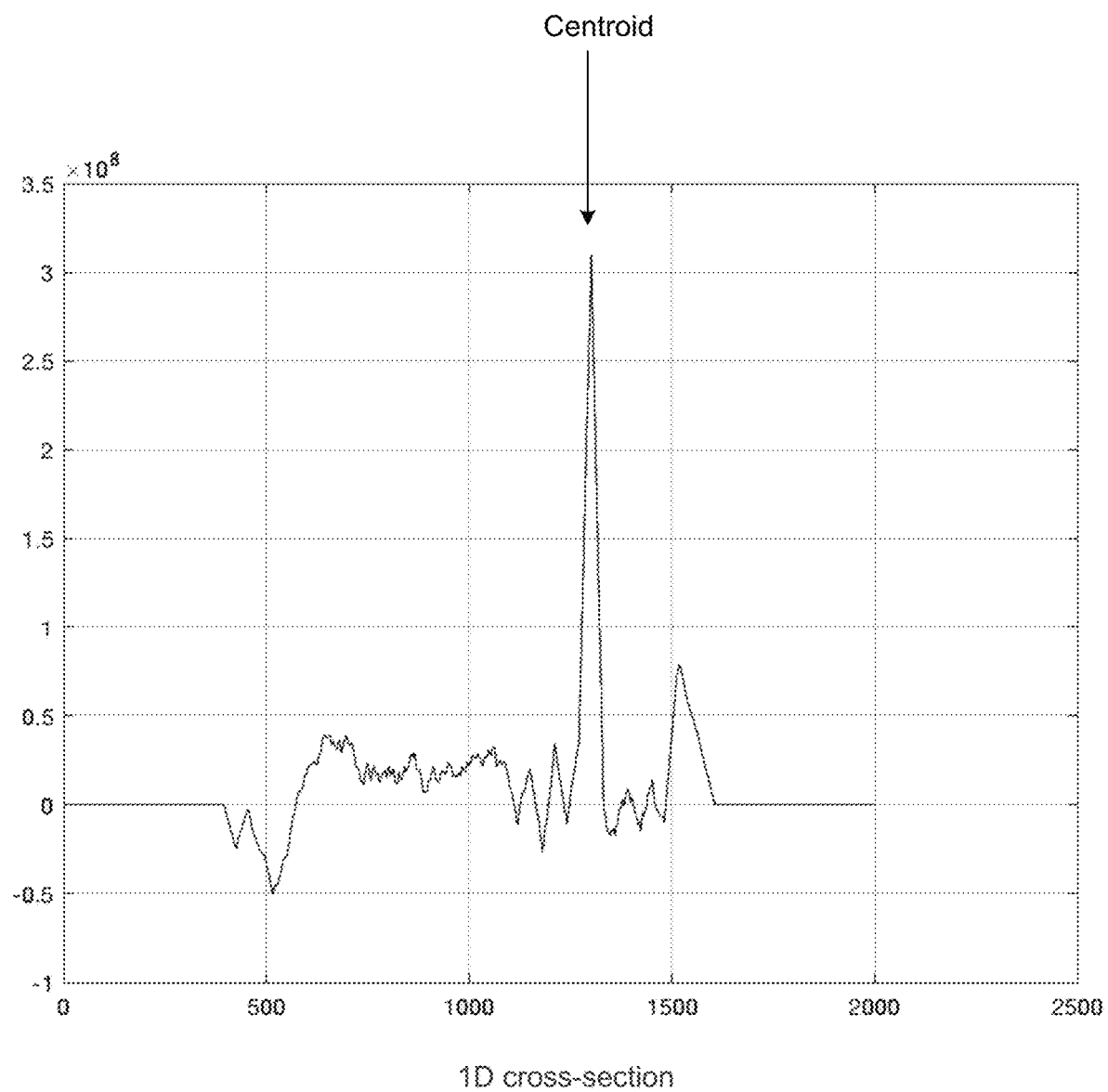

FIGS. 17A-17D illustrate processing of an image that includes a 2D Barker code diffraction pattern with 50% attenuation, according to some embodiments. FIG. 17A shows a real image captured by a camera that includes a 2D Barker code diffraction pattern with 50% attenuation caused by a fiducial pattern on a cover glass in front of the camera. The dashed white square indicates a region within the image that includes the 2D Barker code diffraction pattern. FIG. 17B shows a 2D Barker code correlation kernel that is applied to the image of FIG. 17A in an autocorrelation process to locate the diffraction pattern in the image. FIG. 17C shows a correlation matrix generated by the autocorrelation process. The dashed white square indicates a region that includes the autocorrelation pattern. The lighter spot in the center of the region is the cross-correlation peak or centroid of the autocorrelation pattern. FIG. 17D shows a 1D cross-section of the autocorrelation pattern at the white line shown in FIG. 17C.

Figure 18A:
Figure 18B:
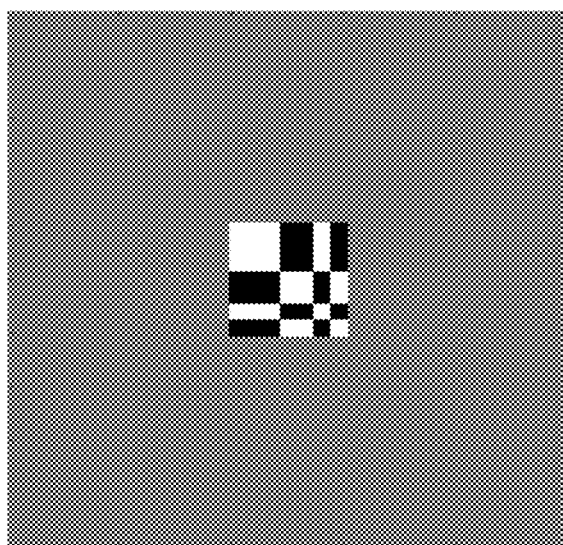
Figure 18C:
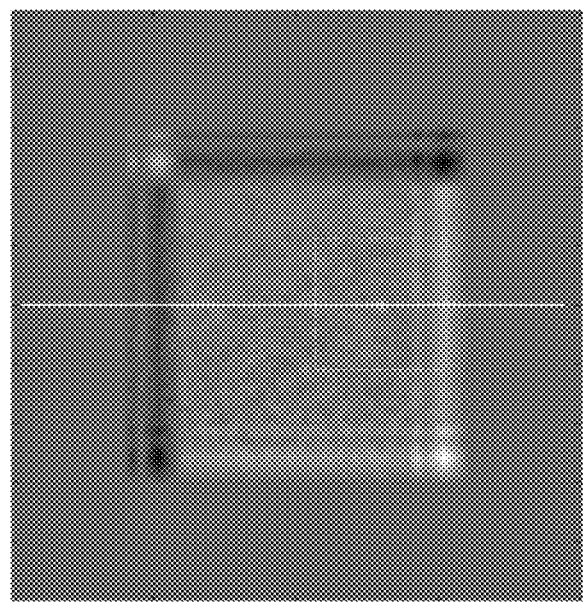

FIGS. 18A-18D illustrate processing of an image that includes a 2D Barker code diffraction pattern with 10% attenuation, according to some embodiments. FIG. 18A shows a real image captured by a camera that includes a 2D Barker code diffraction pattern with 10% attenuation caused by a fiducial pattern on a cover glass in front of the camera. The dashed white square indicates a region within the image that includes the 2D Barker code diffraction pattern. Note that the diffraction pattern is much less visible than the diffraction pattern of FIG. 17A. FIG. 18B shows a 2D Barker code correlation kernel that is applied to the image of FIG. 18A in an autocorrelation process to locate the diffraction pattern in the image. FIG. 18C shows a correlation matrix generated by the autocorrelation process. The dashed white square indicates a region that includes the autocorrelation pattern. The lighter spot in the center of the region is the cross-correlation peak or centroid of the autocorrelation pattern. FIG. 18D shows a 1D cross-section of the autocorrelation pattern at the white line shown in FIG. 18C.

Figure 19A:
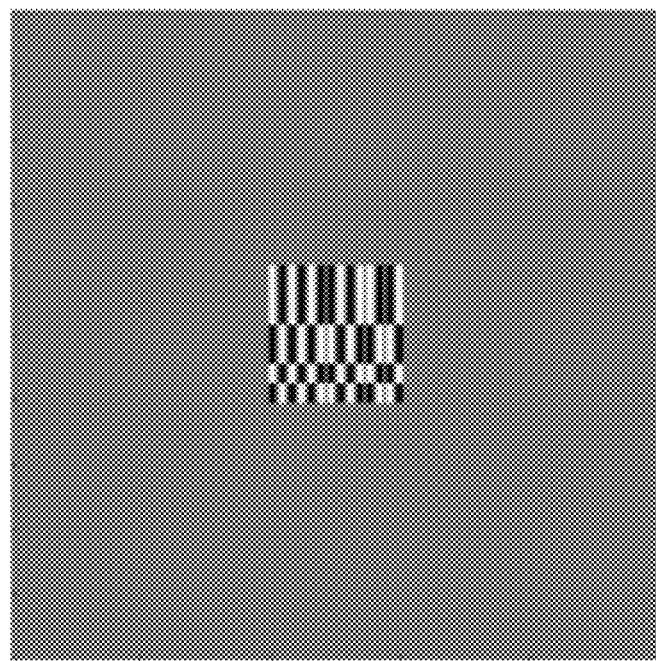
FIGS. 19A-19C illustrate processing of an image that includes a sine-modulated 2D Barker code diffraction pattern with 1% attenuation, according to some embodiments.
Figure 19B:
Figure 19C:
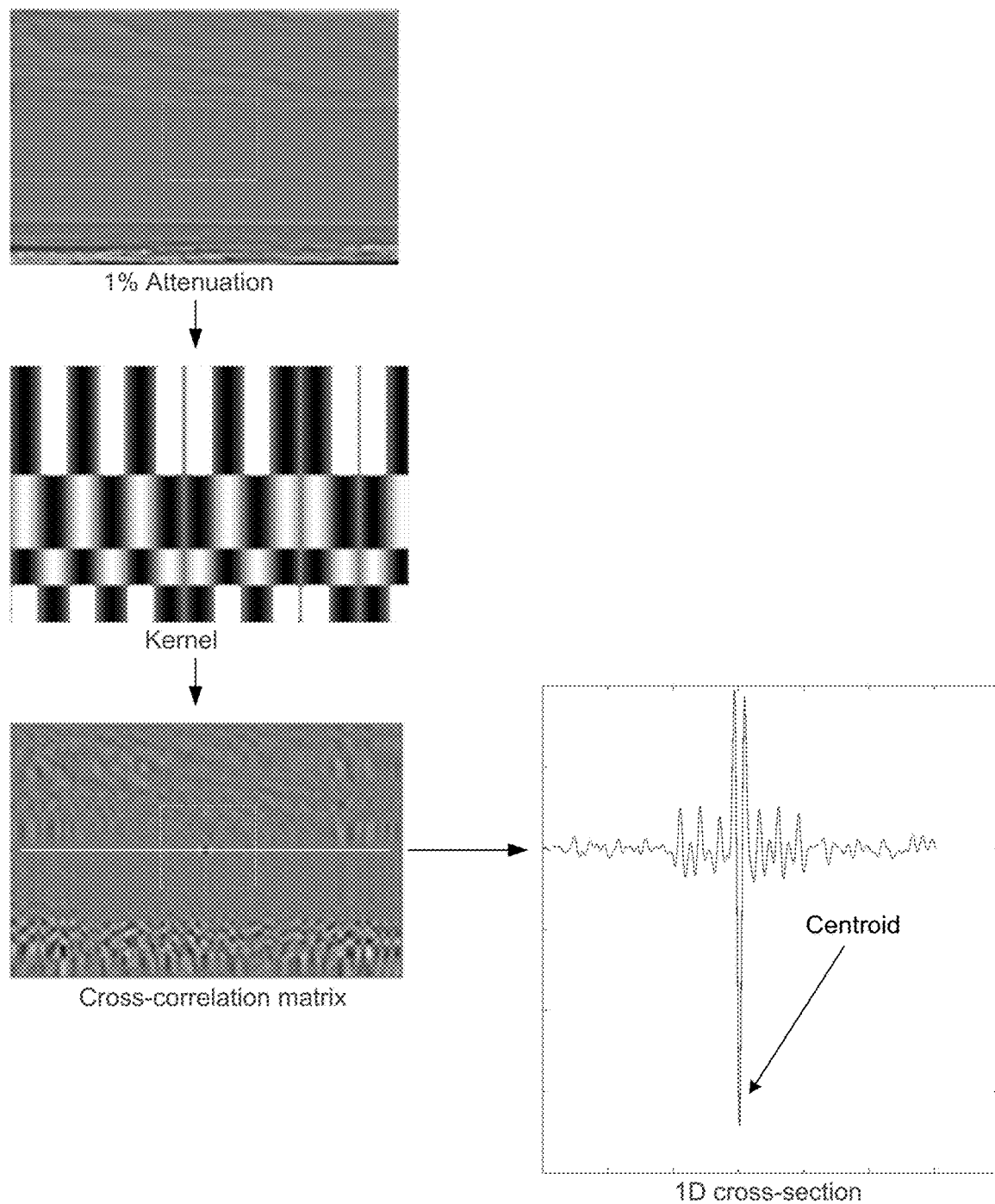

FIGS. 19A-19C illustrate processing of an image that includes a sine-modulated 2D Barker code diffraction pattern with 1% attenuation, according to some embodiments. FIG. 19A shows an example sine-modulated 2D Barker code. FIG. 19B shows a real image captured by a camera that includes a sine-modulated 2D Barker code diffraction pattern with 1% attenuation caused by a fiducial pattern on a cover glass in front of the camera. The dashed white square indicates a region within the image that includes the sine-modulated 2D Barker code diffraction pattern. Note that the diffraction pattern is much less visible than the diffraction patterns of FIGS. 17A and 18A. FIG. 19C shows a sine-modulated 2D Barker code correlation kernel applied to the image in an autocorrelation process to locate the diffraction pattern in the image. FIG. 19C also shows a cross-correlation matrix generated by the autocorrelation process. The dashed white square indicates a region that includes the autocorrelation pattern. The spot in the center of the region is the cross-correlation peak or centroid of the autocorrelation pattern. FIG. 19C also shows a 1D cross-section of the autocorrelation pattern at the white line of the cross-correlation matrix shown in FIG. 19C.

Additional Fiducial Pattern Examples

Figure 21A:
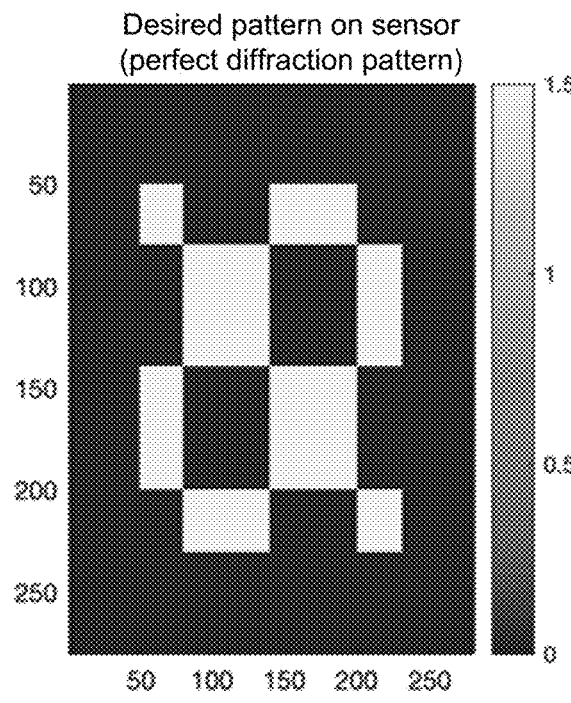
FIGS. 21A-21D illustrate an example non-Barker code pattern that may be used in embodiments.
Figure 21C:
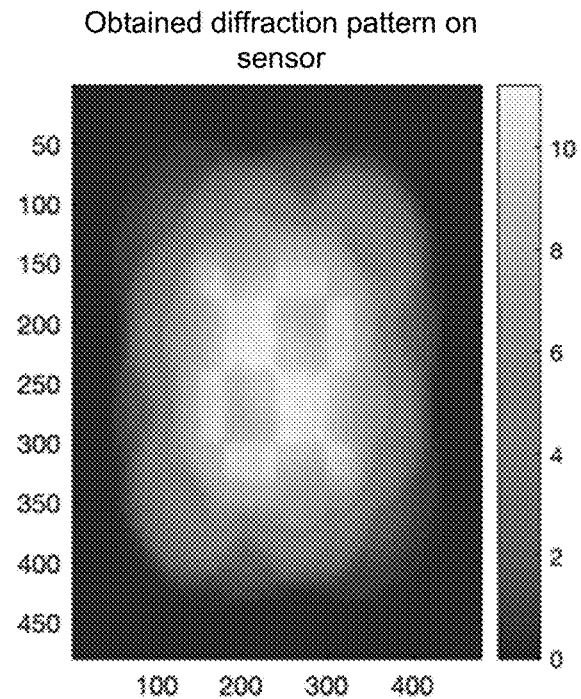
Figure 21B:
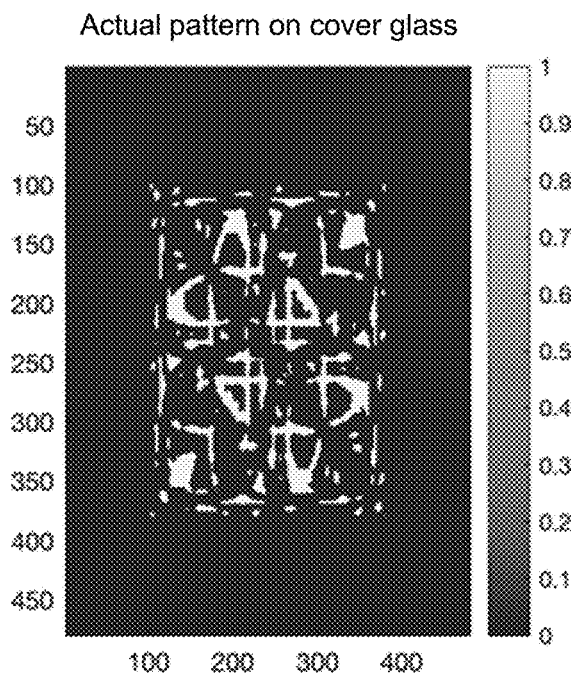
Figure 21D:
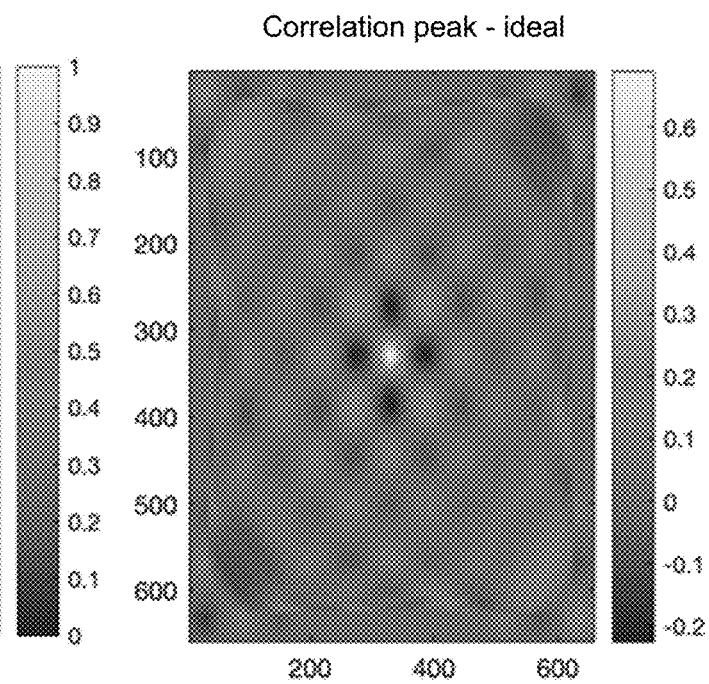

FIGS. 21A-21D illustrate an example non-Barker code pattern that may be used in embodiments. FIG. 21A shows an example non-Barker code pattern that is desired to be obtained as a diffraction pattern at the camera sensor. FIG. 21B shows an example fiducial pattern etched or otherwise provided on the cover glass to affect light passing through the cover glass in order to obtain the desired non-Barker code-like diffraction pattern at the camera sensor. Note that the fiducial pattern is not itself a non-Barker code. FIG. 21C shows an example non-Barker code-like diffraction pattern that may be obtained at the camera sensor using the example fiducial pattern shown in FIG. 21B. FIG. 21D shows an autocorrelation pattern obtained from the diffraction pattern shown in FIG. 21C by applying a respective non-Barker code kernel to the image. The lighter spot in the center is the cross-correlation peak corresponding to the diffraction pattern.

Figure 22A:
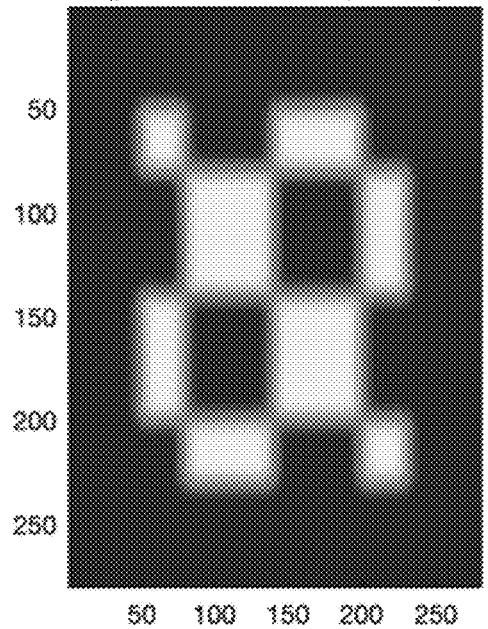
FIGS. 22A-22D illustrate an example low-pass non-Barker code pattern that may be used in embodiments.
Figure 22C:
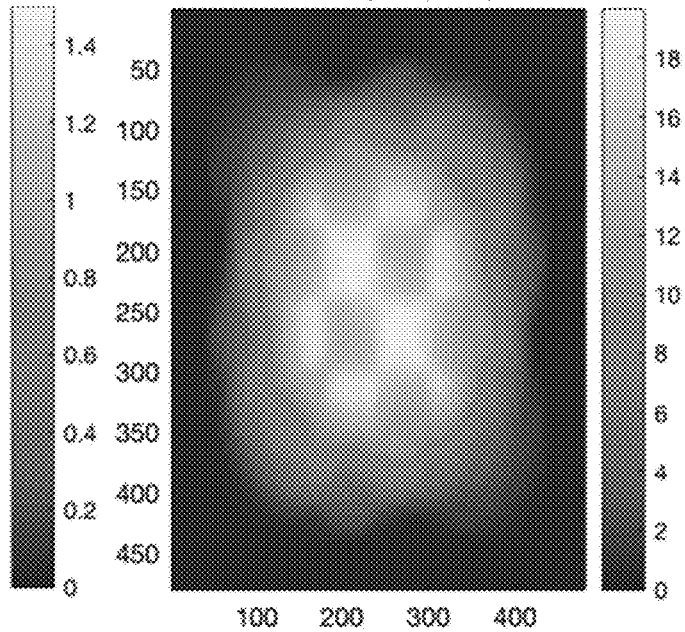
Figure 22B:
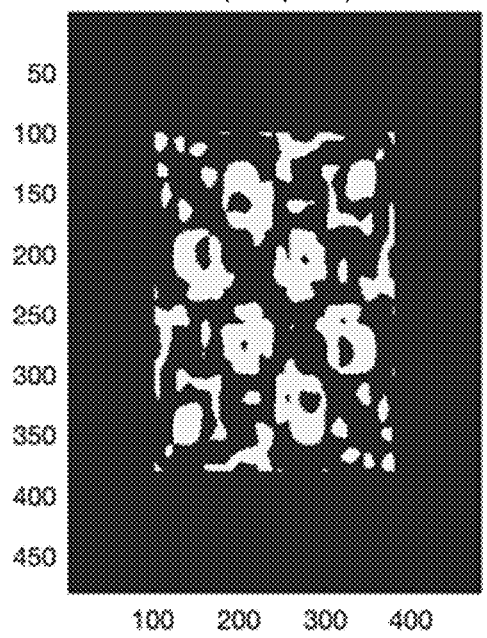
Figure 22D:
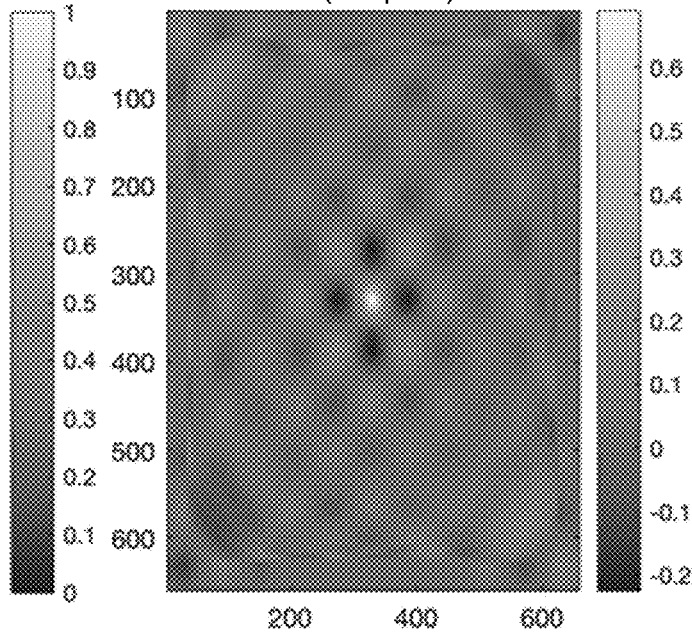

FIGS. 22A-22D illustrate an example low-pass non-Barker code pattern that may be used in embodiments. FIG. 22A shows an example low-pass non-Barker code pattern that is desired to be obtained as a diffraction pattern at the camera sensor. FIG. 22B shows an example fiducial pattern etched or otherwise provided on the cover glass to affect light passing through the cover glass in order to obtain the desired low-pass non-Barker code-like diffraction pattern at the camera sensor. Note that the fiducial pattern is not itself a low-pass non-Barker code. FIG. 22C shows an example low-pass non-Barker code-like diffraction pattern that may be obtained at the camera sensor using the example fiducial pattern shown in FIG. 22B. FIG. 22D shows an autocorrelation pattern obtained from the diffraction pattern shown in FIG. 22C by applying a respective low-pass non-Barker code kernel to the image. The lighter spot in the center is the cross-correlation peak corresponding to the diffraction pattern.

Figure 23A:
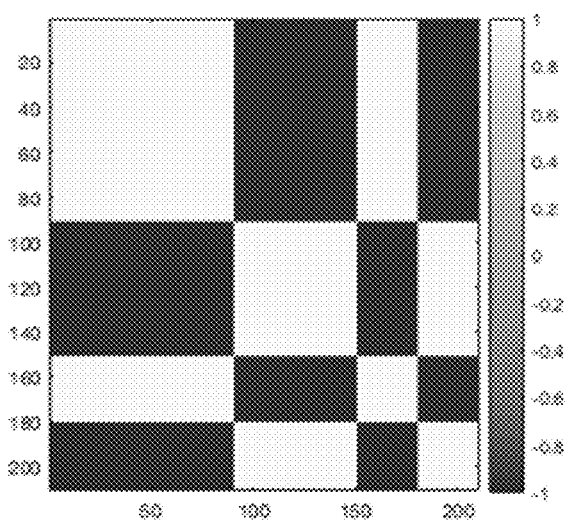
FIGS. 23A-23C illustrate an example 7-bid 2D Barker code pattern that may be used in embodiments.
Figure 23B:
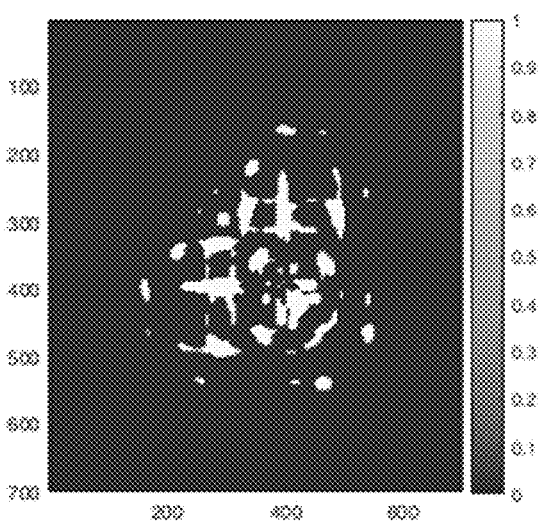
Figure 23C:
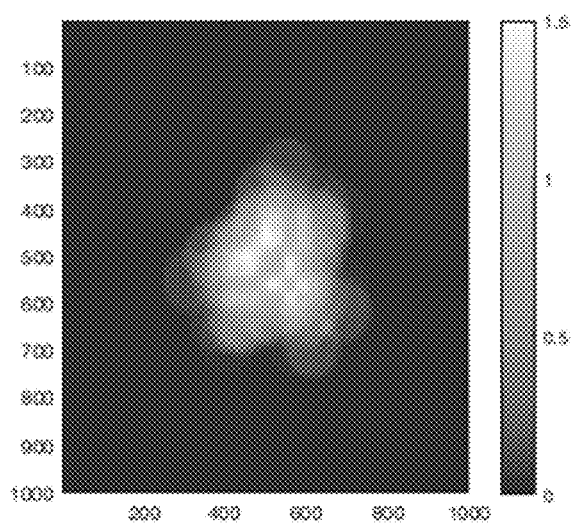

FIGS. 23A-23C illustrate an example 7-bid 2D Barker code pattern that may be used in embodiments. FIG. 23A shows an example 7-bid 2D Barker code pattern that is desired to be obtained as a diffraction pattern at the camera sensor. FIG. 23B shows an example fiducial pattern etched or otherwise provided on the cover glass to affect light passing through the cover glass in order to obtain the desired 7-bid 2D Barker code pattern at the camera sensor. Note that the fiducial pattern is not itself a 7-bid 2D Barker code pattern. FIG. 23C shows an example 7-bid 2D Barker code pattern that may be obtained at the camera sensor using the example fiducial pattern shown in FIG. 23B.

FIGS. 24A-24C illustrate another example 7-bid 2D Barker code pattern that may be used in embodiments. FIG. 24A shows an example 7-bid 2D Barker code pattern that is desired to be obtained as a diffraction pattern at the camera sensor. FIG. 24B shows an example fiducial pattern etched or otherwise provided on the cover glass to affect light passing through the cover glass in order to obtain the desired 7-bid 2D Barker code pattern at the camera sensor. Note that the fiducial pattern is not itself a 7-bid 2D Barker code pattern. FIG. 24C shows an example 7-bid 2D Barker code pattern that may be obtained at the camera sensor using the example fiducial pattern shown in FIG. 24B.

Non-Binary Gradient Fiducial Patterns

The previously described example fiducial patterns are "binary" patterns that include black (fully light blocking) and clear (non-light blocking) regions in the patterns. However, in some embodiments, non-binary gradient fiducial patterns may be used that include regions that only partially block the light. Note that these non-binary gradient fiducial patterns may also, but do not necessarily, include black and/or clear regions, and that the partial light blocking regions may vary in the amount of light they block. FIGS. 25A-25D and 26A-26D show non-limiting examples of non-binary gradient patterns.

Figure 25A:
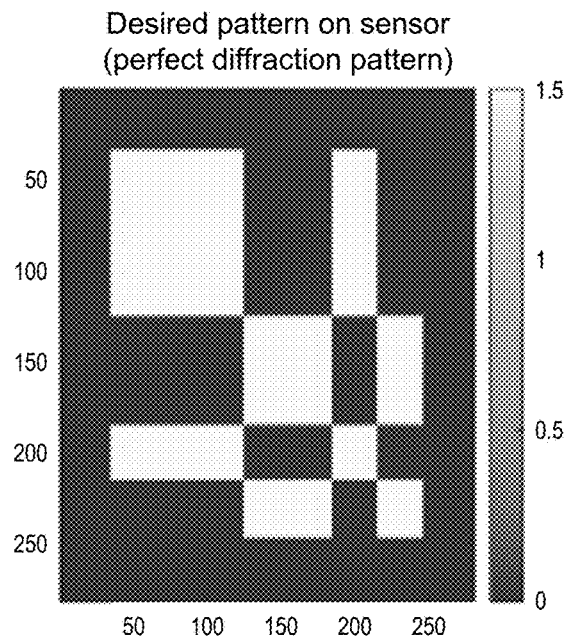
FIGS. 25A-25D illustrate an example non-binary gradient pattern that may be used in embodiments.
Figure 25C:
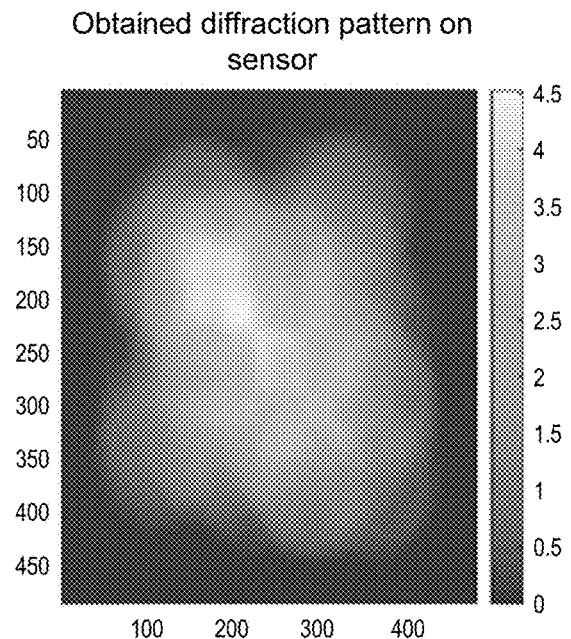
Figure 25B:
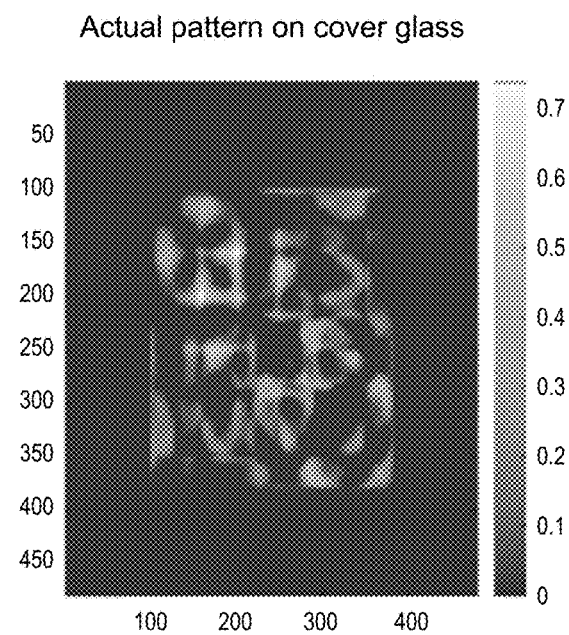
Figure 25D:
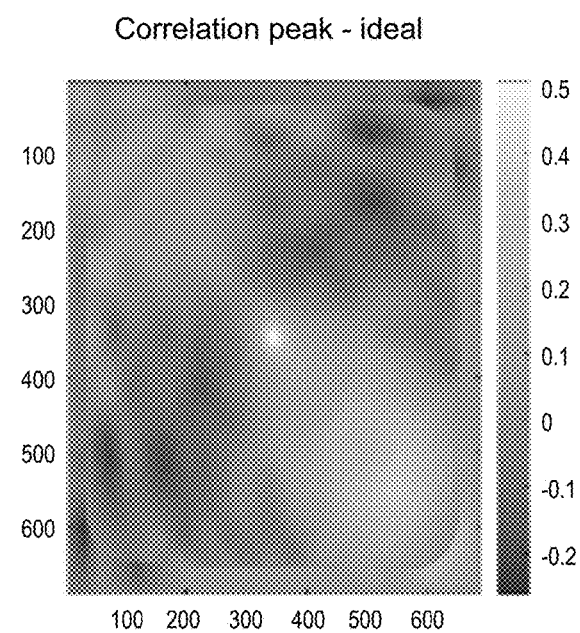

FIGS. 25A-25D illustrate an example non-binary gradient pattern that may be used in embodiments. FIG. 25A shows an example diffraction pattern that is desired to be obtained as a diffraction pattern at the camera sensor. FIG. 25B shows an example non-binary gradient fiducial pattern etched or otherwise provided on the cover glass to affect light passing through the cover glass in order to obtain the desired diffraction pattern at the camera sensor. FIG. 25C shows an example diffraction pattern that may be obtained at the camera sensor using the example fiducial pattern shown in FIG. 25B. FIG. 25D shows an autocorrelation pattern obtained from the diffraction pattern shown in FIG. 25C by applying a respective kernel to the image. The lighter spot in the center is the cross-correlation peak corresponding to the diffraction pattern.

Figure 26A:
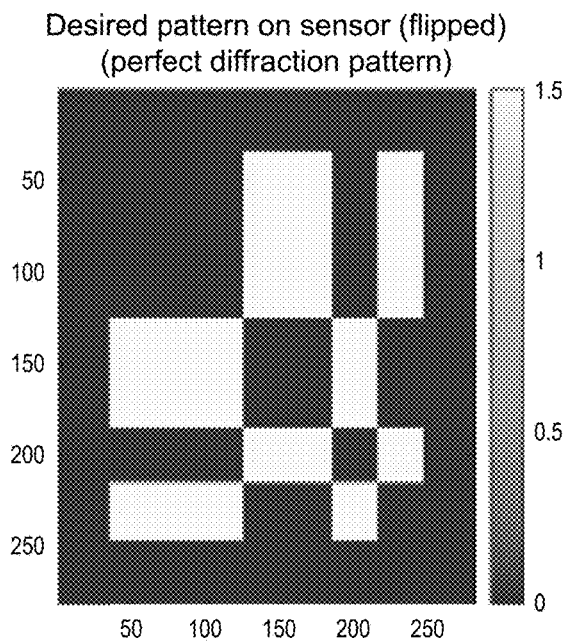
FIGS. 26A-26D illustrate an example "flipped" non-binary gradient pattern that may be used in embodiments.
Figure 26C:
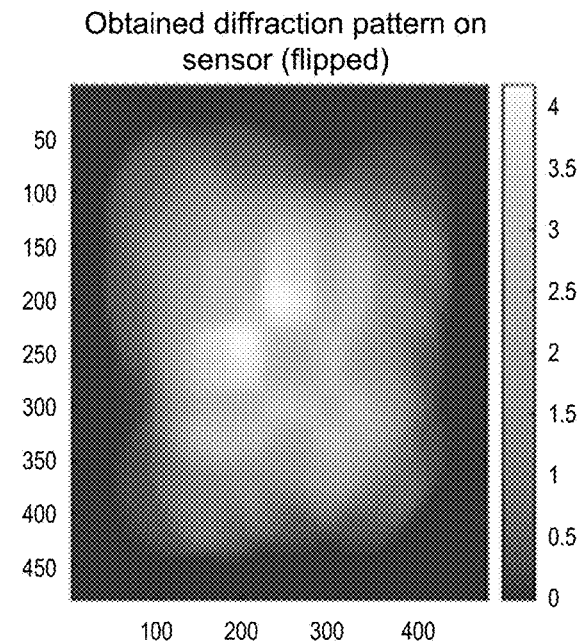
Figure 26B:
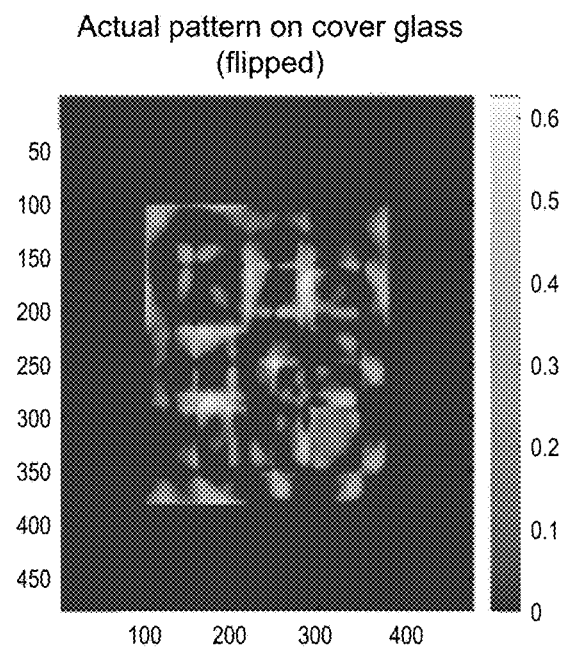
Figure 26D:
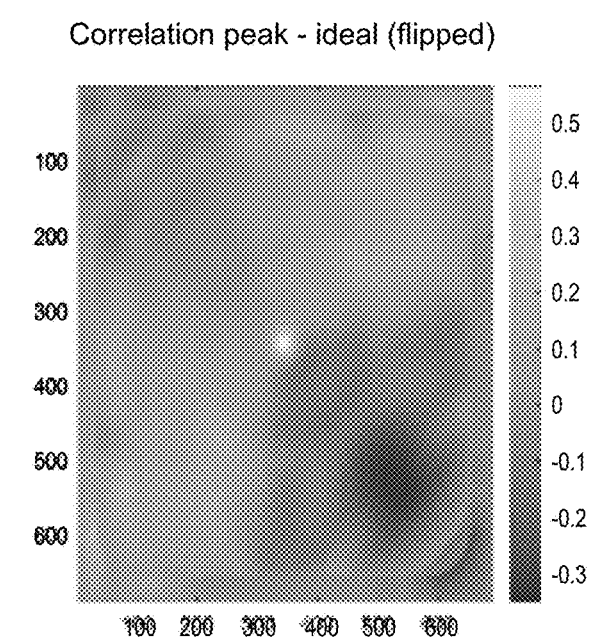

FIGS. 26A-26D illustrate an example "flipped" non-binary gradient pattern that may be used in embodiments. FIG. 26A shows an example "flipped" diffraction pattern (in this example, the diffraction pattern of FIG. 26A is inverted) that is desired to be obtained as a diffraction pattern at the camera sensor. FIG. 26B shows an example non-binary gradient fiducial pattern etched or otherwise provided on the cover glass to affect light passing through the cover glass in order to obtain the desired diffraction pattern at the camera sensor. FIG. 26C shows an example diffraction pattern that may be obtained at the camera sensor using the example fiducial pattern shown in FIG. 26B. FIG. 26D shows an autocorrelation pattern obtained from the diffraction pattern shown in FIG. 26C by applying a respective kernel to the image. The lighter spot in the center is the cross-correlation peak corresponding to the diffraction pattern.

Pattern Discretization to Reduce Attenuation

Figure 27A:
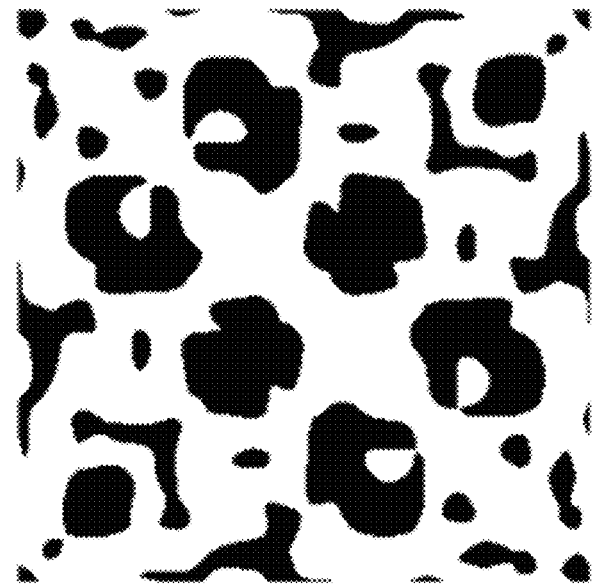
FIGS. 27A and 27B compare example full and sparse patterns on the cover glass, according to some embodiments.
Figure 27B:
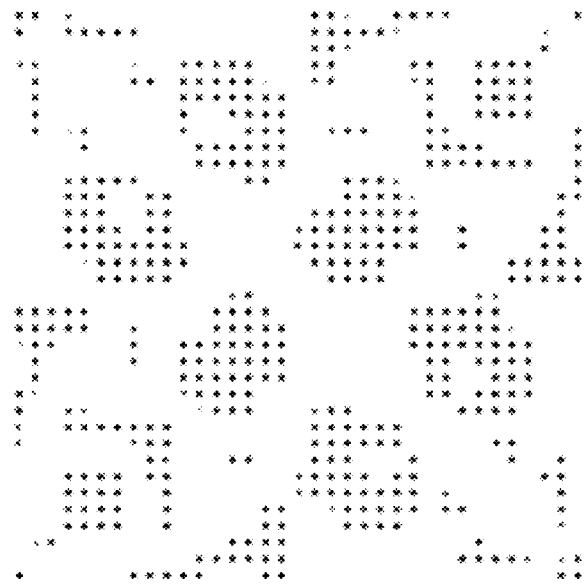

In some embodiments, sparse fiducial patterns may be used on the cover glass. Using a sparse pattern rather than the full fiducial pattern may, for example, reduce attenuation and reduce degradation of the quality of the image caused by the pattern. FIGS. 27A and 27B compare example full and sparse fiducial patterns on the cover glass, according to some embodiments. FIG. 27A shows an example full fiducial pattern etched or otherwise provided on a cover glass. The full pattern may have large attenuation and may degrade the quality of the image. FIG. 27B shows an example sparse fiducial pattern corresponding to the full pattern of FIG. 27A etched or otherwise provided on a cover glass. The sparse pattern has less attenuation than the full pattern, and produces reduced degradation of the quality of the image when compared to the full pattern.

FIG. 27C illustrates an example full pattern on the cover glass, according to some embodiments. FIGS. 27D and 27E illustrate an example sparse pattern corresponding to the full pattern of FIG. 27C on the cover glass, according to some embodiments. FIG. 27D shows the entire sparse pattern. FIG. 27E shows a zoom-in on a region of the pattern of FIG. 27D. In this example, the sparse pattern is composed of 10 um squares spaced 33 um apart. Note that other shapes, sizes, and spacing of the elements in the sparse pattern may be used.

Figures 27F, 27G:
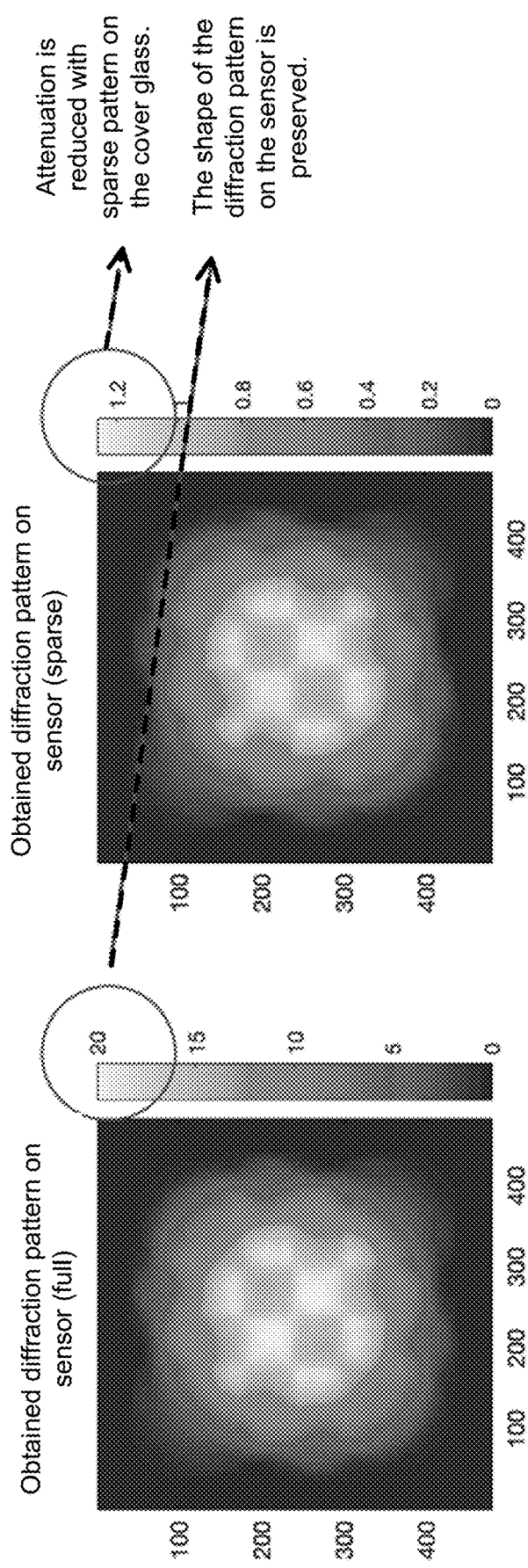
FIGS. 27F and 27G compare the diffraction patterns on the sensor of example full and sparse patterns on the cover glass, according to some embodiments.

FIGS. 27F and 27G compare the diffraction patterns on the sensor of example full and sparse patterns on the cover glass, according to some embodiments. FIG. 27F shows the diffraction pattern achieved by the full pattern of FIG. 27C. FIG. 27G shows the diffraction pattern achieved by the sparse pattern of FIG. 27D. As shown in FIGS. 27F and 27G, attenuation is reduced (in this example from 20 to 1.2) with the sparse pattern on the cover glass, and the shape of the diffraction pattern on the sensor is preserved.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A head-mounted device, comprising:
a camera comprising a camera lens and a camera sensor;
a cover glass on an object side of the camera lens, the cover glass comprising a feature configured to affect light received from an object field in images formed by the camera lens at a surface of the camera sensor; and
one or more processors configured to:
perform a calibration process based on at least one image captured by the camera to determine an offset of the cover glass with respect to the camera lens; and
apply the determined offset during processing of one or more subsequent images captured by the camera to account for distortion in the one or more subsequent images caused by a corresponding shift in the cover glass with respect to the camera lens.

2. The head-mounted device as recited in claim 1, wherein, to determine an offset of the cover glass with respect to the camera lens, the one or more processors are configured to locate a centroid of a diffraction pattern caused by the feature on the camera sensor, and compare a location of the centroid on the camera sensor to a known location on the camera sensor determined during a previous calibration process.

3. The head-mounted device as recited in claim 2, wherein the one or more processors are configured to apply a correlation technique to at least one image captured by the camera to locate the centroid of the diffraction pattern on the camera sensor, including to apply a correlation kernel corresponding to the diffraction pattern to the at least one image captured by the camera to locate the centroid of the diffraction pattern on the camera sensor.

4. The head-mounted device as recited in claim 3, wherein the correlation kernel is a two-dimensional (2D) Barker code.

5. The head-mounted device as recited in claim 3, wherein the correlation kernel is a sine-modulated two-dimensional (2D) Barker code.

6. The head-mounted device as recited in claim 3, wherein the diffraction pattern is a sine-modulated two-dimensional (2D) Barker code diffraction pattern, wherein the correlation kernel is a 2D Barker code, and wherein the one or more processors are configured to apply a demodulation method to the one or more images to demodulate the sine-modulated Barker code diffraction pattern prior to applying the correlation kernel to the one or more images.

7. The head-mounted device as recited in claim 3, wherein the correlation kernel is a circular two-dimensional (2D) Barker code.

8. The head-mounted device as recited in claim 3, wherein the correlation kernel is a two-dimensional (2D) random code.

9. The head-mounted device as recited in claim 1, wherein to perform the calibration process the one or more processors are configured to apply a correlation technique to at least one image captured by the camera to locate a centroid of a diffraction pattern caused by the feature on the camera sensor.

10. The head-mounted device as recited in claim 9, wherein, to apply the correlation technique to at least one image captured by the camera to locate a centroid of a diffraction pattern caused by the feature on the camera sensor, the one or more processors are configured to:
apply the correlation technique to multiple images captured by the camera to locate diffraction patterns on the camera sensor;
average the diffraction patterns across the multiple images; and
locate the centroid of the diffraction pattern on the camera sensor from the averaged diffraction patterns.

11. The head-mounted device as recited in claim 1,
wherein the feature of the cover glass comprises two or more fiducial patterns configured to affect light received from the object field to cause two or more diffraction patterns in images formed by the camera lens at the surface of the camera sensor; and
wherein, to perform the calibration process the one or more processors are configured to apply a correlation technique to at least one image captured by the camera to locate a centroid of the diffraction pattern on the camera sensor, including to:
apply respective correlation kernels corresponding to the diffraction patterns to at least one image captured by the camera to locate centroids of the diffraction patterns on the camera sensor; and
determine the offset of the cover glass with respect to the camera lens from the located centroids.

12. The head-mounted device as recited in claim 1, comprising two or more cameras located behind the cover glass, each camera comprising a camera lens and a camera sensor;
wherein, for each of the two or more cameras, the cover glass comprises one or more fiducial patterns configured to affect light received from the object field to cause a respective one or more diffraction patterns in images formed by the respective camera lens at a surface of the respective camera sensor;
wherein, to perform the calibration process the one or more processors are configured to apply a correlation technique to at least one image captured by the camera to locate a centroid of the diffraction pattern on the camera sensor, including to:
apply respective correlation kernels corresponding to the diffraction patterns to images captured by the two or more cameras to locate centroids of the diffraction patterns on the camera sensors; and
determine distortion or shift of the cover glass with respect to the camera lenses from the located centroids.

13. A method, comprising:
receiving light from an object field at a cover glass on an object side of a camera of a head-mounted device, the cover glass including a feature;
capturing, by the camera, one or more images, wherein the feature affects the light received by the camera to capture the one or more images;
performing, by one or more processors, a calibration process based on at least one image captured by the camera to determine a shift of the cover glass with respect to the camera; and
adjusting processing of one or more subsequent images captured by the camera to account for the determined shift in the cover glass with respect to the camera.

14. The method as recited in claim 13, wherein determining the shift of the cover glass with respect to the camera lens comprises comparing a location of a centroid of a diffraction pattern in the at least one image caused by the feature to a known location determined during a previous calibration process.

15. The method as recited in claim 14, further comprising applying a correlation kernel to locate the centroid, wherein the correlation kernel is one of a two-dimensional (2D) Barker code or a sine-modulated two-dimensional (2D) Barker code.

16. The method as recited in claim 14, further comprising:
applying a correlation kernel to locate the centroid, wherein the diffraction pattern is a sine-modulated two-dimensional (2D) Barker code diffraction pattern, wherein the correlation kernel is a 2D Barker code, and
applying a demodulation method to the at least one imager to demodulate the sine-modulated Barker code diffraction pattern prior to applying the correlation kernel.

17. The method as recited in claim 14, further comprising applying a correlation kernel to locate the centroid, wherein the correlation kernel is one of a circular two-dimensional (2D) Barker code and a two-dimensional (2D) random code.

18. The method as recited in claim 14, further comprising applying a correlation kernel to locate the centroid, wherein applying the correlation kernel corresponding comprises:
applying the correlation kernel to multiple images captured by the camera to locate the diffraction patterns;
averaging the diffraction patterns across the multiple images; and
locating the centroid of the diffraction pattern from the averaged diffraction patterns.

19. The method as recited in claim 14, wherein the feature of the cover glass includes two or more fiducial patterns that affect light received from the object field to cause two or more diffraction patterns in images formed by the camera, the method further comprising:
applying respective correlation kernels corresponding to the diffraction patterns to at least one image captured by the camera to locate centroids of the diffraction patterns; and
determining shift of the cover glass with respect to the camera from the located centroids.

20. The method as recited in claim 13, wherein there are two or more cameras located behind the cover glass, each camera comprising a camera lens and a camera sensor, wherein, for each of the two or more cameras, the cover glass comprises one or more fiducial patterns configured to affect light received from the object field to cause a respective one or more diffraction patterns in images formed by the respective camera lens at a surface of the respective camera sensor, the method further comprising:
applying respective correlation kernels corresponding to the diffraction patterns to images captured by the two or more cameras to locate centroids of the diffraction patterns on the camera sensors; and
determining distortion or shift of the cover glass with respect to the camera lenses from the located centroids.

* * * * *